United States Patent [19]

Katayama et al.

[11] Patent Number: 5,798,791
[45] Date of Patent: Aug. 25, 1998

[54] MULTIEYE IMAGING APPARATUS

[75] Inventors: Tatsushi Katayama, Tokyo; Shigeyuki Suda; Hideaki Mitsutake, both of Yokohama, all of Japan

[73] Assignee: Canon Kabushiki Kaisha, Tokyo, Japan

[21] Appl. No.: 751,242

[22] Filed: Nov. 18, 1996

Related U.S. Application Data

[63] Continuation of Ser. No. 179,921, Jan. 12, 1994, abandoned.

[30] Foreign Application Priority Data

Jan. 14, 1993 [JP] Japan ............... 5-005242

[51] Int. Cl.$^6$ ............................................. H04N 5/225
[52] U.S. Cl. ........................... 348/218; 348/36; 348/47
[58] Field of Search ................................ 348/14, 15, 36, 348/37, 38, 39, 42, 43, 44, 46, 47, 151, 218, 443, 444, 445, 446, 45, 48, 49, 50; 358/446, 450; 382/268, 284, 154; 356/376; 352/43, 60–65, 69–71

[56] References Cited

U.S. PATENT DOCUMENTS

| | | | |
|---|---|---|---|
| 4,825,393 | 4/1989 | Nishiya | 364/560 |
| 4,890,314 | 12/1989 | Judd et al. | 348/14 |
| 4,963,962 | 10/1990 | Kruegle et al. | 348/151 |
| 5,001,348 | 3/1991 | Dirscherl et al. | 250/372 |
| 5,038,224 | 8/1991 | Martulli et al. | 358/446 |
| 5,130,794 | 7/1992 | Ritchey | 348/39 |
| 5,187,754 | 2/1993 | Currin et al. | 382/284 |
| 5,347,363 | 9/1994 | Yamanaka | 356/376 |
| 5,386,228 | 1/1995 | Okino | 348/218 |
| 5,455,689 | 10/1995 | Taylor et al. | 358/450 |

FOREIGN PATENT DOCUMENTS 0335004  4/1989  European Pat. Off. ....... H04N 13/02

*Primary Examiner*—Andrew I. Faile
*Assistant Examiner*—Andrew B. Christensen
*Attorney, Agent, or Firm*—Morgan & Finnegan, L.L.P.

[57] ABSTRACT

Disclosed is a multieye imaging apparatus for imaging an image field including an overlapped area by controlling a plurality of pick-up-image systems for obtaining an image having a desired aspect ratio that is different from an image obtained from a pick-up-image optical system. The multieye imaging apparatus has an image correlation processing unit for effecting a correlation operation from image signals obtained from a plurality of pick-up-image systems. The apparatus also has an image synthesizing processing unit for joining the other image on the basis of one image from the image signals relative to the correlation operation performed by the image correlation processing unit.

9 Claims, 30 Drawing Sheets

MULTIEYE IMAGING APPARATUS

This is continuation of application Ser. No. 08/179,921, filed on Jan. 12, 1994, now abandoned.

BACKGROUND OF THE INVENTION

1. Field of the Invention

The present invention relates generally to an imaging apparatus employing imaging devices such as CCDs (Charge Coupled Devices), image pickup tubes, etc., and more particularly, to a multieye imaging apparatus such as a television or video apparatus capable of providing an image having an arbitrary aspect ratio by imaging through a plurality of imaging devices and pick-up-image systems of lenses.

2. Related Background Art

For example, Japanese Patent Application Laid-Open No. 63-8641 discloses a known method as a panorama photographing techneque aiming at a motion picture by use of a plurality of pick-up-image optical systems. In general, according to such a techneque an angle made by optical axes of the respective pick-up-image optical systems is set by a mechanical adjustment to give a contiguity of an image field.

On the other hand, a known method of varying an image aspect ratio (e.g., conversions of 4:3 of NTSC and 16:9 of HD) in the television or video apparatus is directed to a method of trimming up-and-down or right-and-left portions.

SUMMARY OF THE INVENTION

In some of the above techneques of setting the angle made by the optical axes of the pick-up-image optical systems through the mechanical adjustment, it is difficult to precisely align registrations of two images adjacent to each other. There arises a problem in which normally a boundary line thereof becomes conspicuous. For the same reason, it is difficult to refocus an object having a different object distance and perform a zooming operation. In the great majority of cases, the operation is restricted to cut-picturing for every scene.

Further, the method for trimming the output is a type for using a portion of the image after an imaging process. Hence, especially when imaging through an NTSC camera using a 4:3 image, sensor and outputting through a 16:9 HD monitor, the number of pixels originally lacks. In addition to this, when the upper and lower portions are added, totally 25% of the pixels are lost. An image quality is deteriorated remarkably. Reversely when imaging through a 16:9 HD camera and outputting through a 4:3 NTSC monitor, there is no problem as to the image quality. A horizontal angle is, however, reduced by a factor of 3. Besides, the image field formed by one imaging optical system does not suffice for utilizing a panoramic effect. Moreover, an imaging power in the vertical direction is lost by trimming when an aspect-ratio is variable, thereby inducing the decline in terms of the image quality. This problem becomes more serious with an increasing spread of wide-picture display devices as seen of late.

It is a primary object of the present invention, which has been devised in view of those problems, to provide a multieye imaging apparatus capable of obtaining an image having a desired aspect ratio that is different from an image obtained from a pick-up-image optical system.

It is another object of the present invention to provide a multieye imaging apparatus capable of obtaining an image with a less amount of deterioration of an image quality and an inconspicuous boundary line.

It is still another object of the present invention to provide a multieye imaging apparatus capable of synthesizing images by removing a double image of an overlapped area of the respective images.

It is a further object of the present invention to provide a multieye imaging apparatus capable of having an image field enough to acquire sufficient effects as a panoramic image and minimizing a deterioration of a resolution power in the vertical direction even at the aspect-ratio-variable time.

It is a still further object of the present invention to provide a multieye imaging apparatus capable of incorporating high-speed aspect-ratio-variable and trimming functions and instantaneously freely varying an object area according to intentions of a photographer.

According to one aspect of the present invention, there is provided a multieye imaging apparatus for picking up an image, overlapping an image field by controlling a plurality of pick-up-image systems. The apparatus comprises an image correlation processing unit for effecting a correlation operation from an image signal of the overwrapping portion obtained by said plurality of pick-up-image systems. The apparatus also comprises a synthesizing processing unit for joining the other image on the basis of one image from the image signal relative the correlation operation performed by the image correlation processing unit.

According to another aspect of the present invention, there is provided a multieye imaging apparatus for picking up an image, overlapping an image field by controlling a plurality of pick-up-image systems. The apparatus comprises a corresponding point detecting unit for detecting an image corresponding point of the overlapped area from an image signal of the overlapped area outputted from the plurality of pick-up-image systems and a correction conversion processing unit for correcting the image signal outputted from the plurality of pick-up-image systems on the basis of detection signal outputted from the corresponding point detecting unit. The apparatus further comprises an image correlation prossing unit for detecting a correlation from the image signal corrected by the correction conversion processing unit. The apparatus further comprises an image synthesizing processing unit for converting the image signal outputted from the plurality of pick-up-image systems into one image signal in accordance with the correlation detected by the image correlation processing unit.

According to still another aspect of the present invention, there is provided a multieye imaging apparatus, having a plurality of imaging optical systems and a plurality of pick-up-image systems constructed of a imaging device corresponding respectively to the plurality of imaging optical systems, for generating a synthesized image by use of an image signal outputted from each of the imaging devices. The apparatus comprises a plurality of image inputting units for holding each image signal outputted from the pick-up-image systems each set so that an image field formed by the respective pick-up-image systems is held in such a state as to be contiguous to at least one of the other image fields or partially overlapped therewith. The apparatus also comprises a total system controlling unit for inputting an image trimming signal containing an aspect ratio designated value and an image transforming unit for output-generating an aspect-ratio-variable image on the basis of an image signal held by the image inputting unit and an image trimming signal inputted by the total system controlling unit.

This multieye imaging apparatus further comprises a controlling unit for varying optical parameters of the plurality of pick-up-image systems while holding an image trimming area corresponding to the aspect ratio designated value inputted to the total system controlling unit after the image transforming unit has outputted the image.

In this multieye imaging apparatus, the optical parameters may be focal lengths and convergence angles of the plurality of pick-up-image systems.

Further in this multieye imaging apparatus, optical axes of the plurality of pick-up-image systems are defined as such a system as to vary in a direction parallel to single plane. Final designated values of the optical parameters after being varied are such that a perpendicular effective width, perpendicular to the single plane, of a light receiving element of each of the plurality of pick-up-image systems is coincident with a perpendicular effective width of the image trimming area.

According to the present invention, the corresponding point of the overlapped area is detected by an overlapped area image signal outputted from each pick-up-image system. Further by using a plurality of image signals outputted from each of the pick-up-image systems, one area or all the area of one image are synthesized on the basis of the other image and the convergence angle of the pickup-image systems are varied whereby the aspect ratio of the image is arbitrarily changed.

According further to the present invention, the respective pick-up-image systems are set so that the image field formed by the respective pick-up-image systems is held in such a state as to be contiguous to at least one of other image fields or partially overlapped therewith. Aspect-ratio-variable images are output-synthesized based on the image trimming signal containing the aspect ratio designated value inputted by the photographer.

Further, the multieye imaging apparatus of this invention is constructed such that the optical parameters of the plurality of pick-up-image systems are varied while holding the image trimming area corresponding to the aspect ratio designated value after the aspect-retio-variable images have been output-synthesized to output the images.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

To start with, a basic layout of a multieye imaging system in accordance with a first embodiment of the present invention will be explained with reference to FIG. 1.

Figure 1:
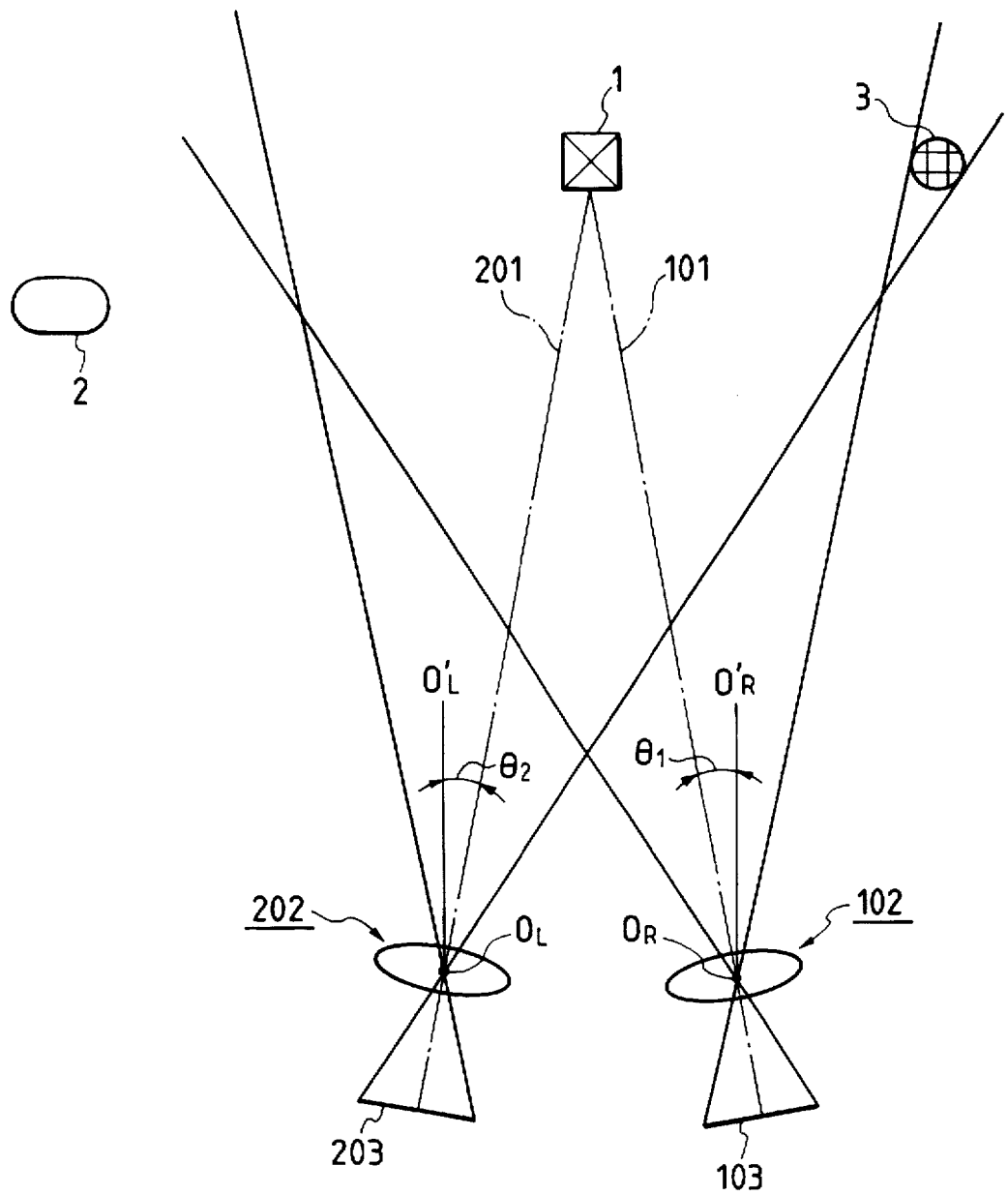
FIG. 1 is a view illustrating a basic layout of a first embodiment of a multieye pick-up-image system according to this invention.

In FIG. 1, the numerals 1, 2, 3 designate first, second and third objects. First and second pick-up-image optical systems 102, 202 have equivalent specifications and generally involve the use of zoom lenses. Image sensors 103, 203 similarly have equivalent specifications and involves the use of an image pickup tube such as saticon, etc. and a solid-state imaging device like a CCD, etc. (herein, a single plate type (or single tube type) is schematically illustrated for simplicity. The generality is not, however, lost in the case of a double plate type (double tube type) or a three plate type (three tube type) through a color separation optical system.

The pick-up-image optical systems 102, 202 are respectively so arranged as to be inclined at $\theta_1$, $\theta_2$ to rotational angle fiducial lines $O_L$–$O_L'$ and $O_R$–$O_R'$ passing through respective rotational centers in the multieye imaging system with the result that optical axes 101, 201 thereof intersect each other on the first object. The pick-up-image optical systems 102, 202 are herein arranged and controlled so that $\theta_1$, $\theta_2$ are equal to each other at all times. Note that $\theta_1$, $\theta_2$ are defined as convergence angles, and an imaging process is performed while these convergence angles are varied corresponding to variations of object distances.

Next, components and functions of the multieye imaging system in the first embodiment will be explained with reference to FIG. 2.

Figure 2:
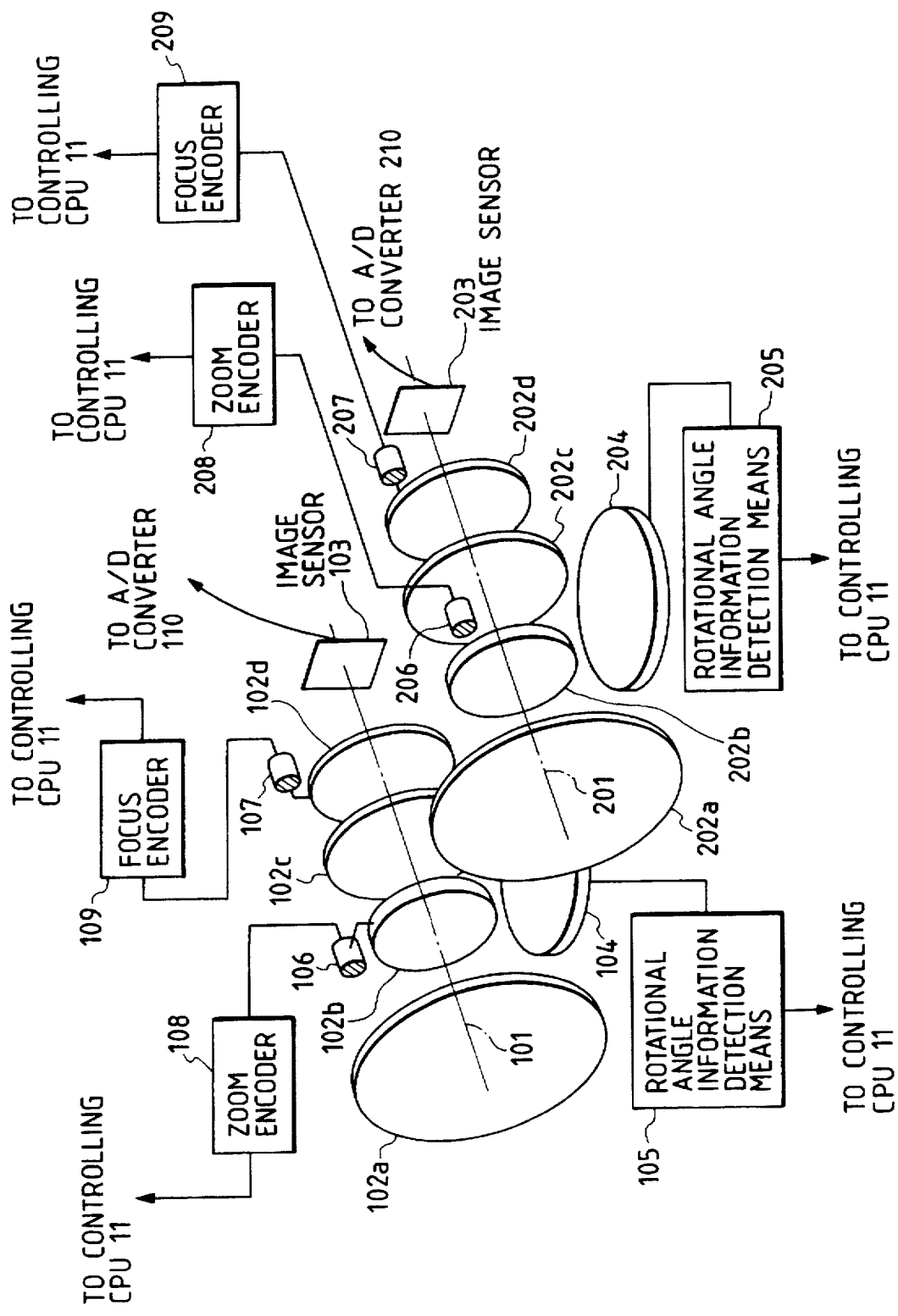
FIG. 2 is a view showing a basic construction of the multieye imaging apparatus in the first embodiment.

Referring to FIG. 2, the first and second pick-up-image optical systems 102, 202 are constructed of lens groups 102a, 102b, 102c, 102d and 202a, 202b, 202c, 202d. Especially, the lens groups 102b, 202b are variable-power lens groups, while the lens groups 102d, 202d are focusing lens groups. Further, driving systems (zoom motors) 106, 206 drive the variable-power lens groups 102b, 202b. Similarly, driving systems (focusing motors) 107, 207 drive the focusing lens groups 102d, 202d. Besides; sets of the pick-up-image optical systems and the image sensors, namely numerals 102 and 103 and numerals 202 and 203 respectively have unillustrated mechanism systems rotating within the planes substantially including substantially the optical axes 101, 201 and driving systems (convergence angle motors) 104, 204 in combination. Then, rotational angle information detecting units 105, 205 are also provided therein. These units may be externally-attached members such as rotary encoders or such a system that a driving system itself like, e.g., a pulse motor knows the angular information by a driving method by itself. Convergence angles are respectively obtained from signals thereof. Further, encoders (zoom encoders) 108, 208 are provided for the variable-power lens groups 102b, 202b of the pick-up-image optical systems. The encoders 108, 208 obtain positional information of the respective lens groups in optical-axis directions. Focal lengths f of the pick-up-image optical systems 102, 202 are obtained from signals thereof.

Similarly, encoders (focus encoders) 109, 209 are provided with the focusing lens groups 102d, 202d of the pick-up-image optical systems. The encoders 109, 209 obtain positional information of the respective lens groups in the optical-axis directions. These encoders may be externally-attached members such as, e.g., potentiometers or such a system that a driving system itself like, e.g., a pulse motor knows the positional information of the lenses in the optical-axis directions by itself.

Herein, the variable-power lens group 202b of the pick-up-image optical system of FIG. 2 is provided beforehand with an encoder (zoom encoder) 208 for obtaining the positional information of the lens group in the optical-axis direction. The focal length f of the pick-up-image optical system 202 is acquired from a signal thereof. The focusing lens group 202d of the pick-up-image optical system is likewise provided with an encoder (focus encoder) 209 for obtaining the positional information of the lens group in the optical-axis direction. An imaging magnification $\beta$ of the pick-up-image optical system 202 is obtained in combination with the signal of the zoom encoder 208. The second pick-up-image optical system 202 incorporates the same function.

Note that the driving systems 106, 107, 206, 207 are separately controlled by a controlling unit microcomputer (termed a |controlling CPU|) 11 in response to the signals from the encoders 108, 109, 208, 209. The focal lengths f of two sets of pick-up-image optical systems 102, 202 are thereby made identical all the time.

Figure 3:
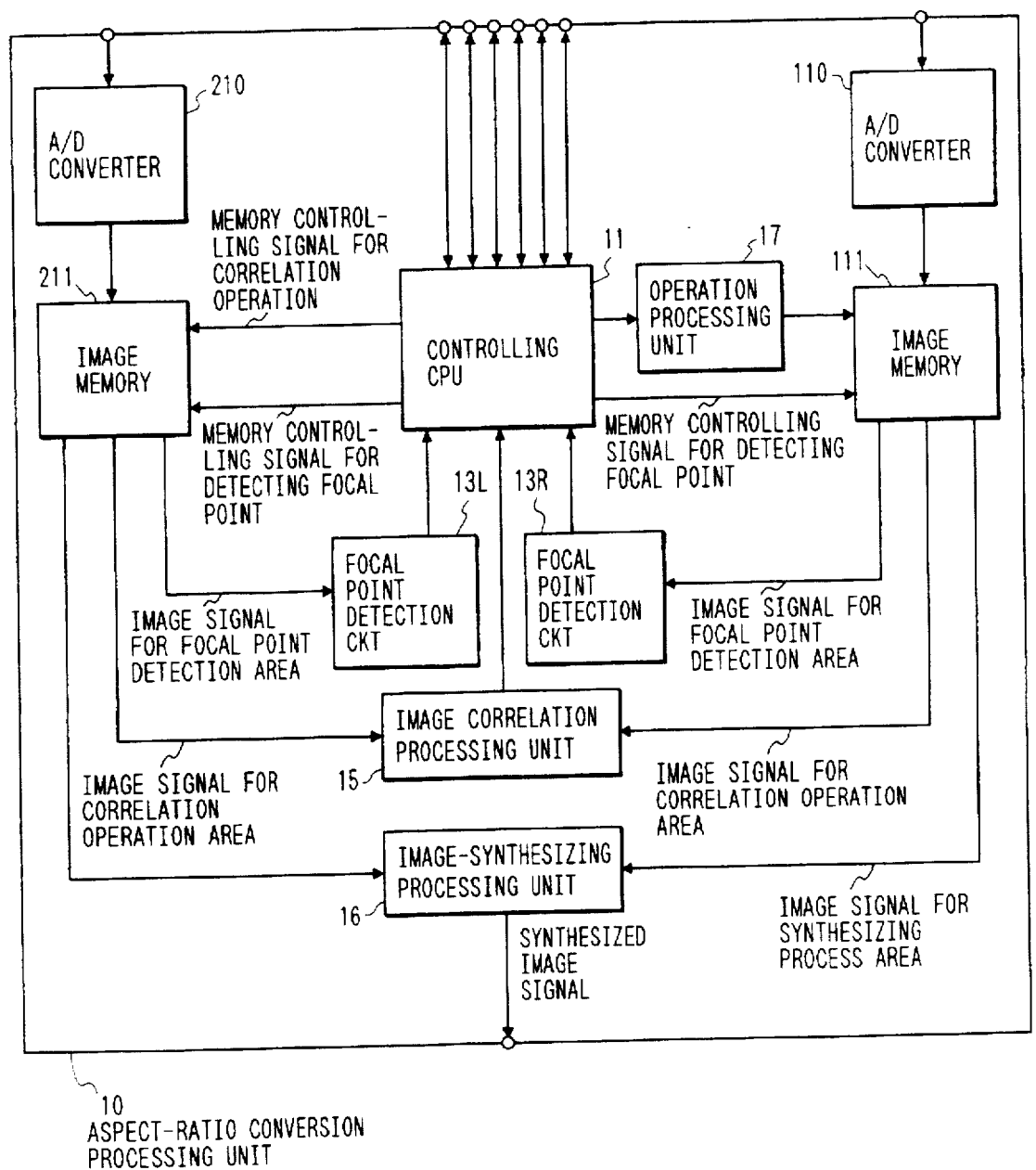
FIG. 3 is a block diagram illustrating an aspect ratio conversion processing unit 10 in the first embodiment.

Next, a configuration of an aspect ratio conversion processing unit 10 will be explained. As illustrated in FIG. 3, the aspect ratio conversion processing unit 10 comprises first and second A/D converters 110, 210, first and second image memories 111, 211, an image synthesizing processing unit 16, an image correlation processing unit 15, a focal point detection unit 13L, a focal point detection unit 13R, an operation controlling unit 17 and a CPU 11. The first and second converters 110, 210 convert analog image signals outputted from the image sensors 103, 203 shown in FIG. 2 into digital image signals. The first and second image memories 111, 211 store the digital signals outputted from the respective A/D converters 110, 210. The image synthesizing processing unit 16 image-synthesizes the digital image signals stored in the respective image memories 111, 211 and outputs synthesized image signals to the outside. The image correlation processing unit 15 performs an image correlation operation from the digital image signals stored in the image memories 111, 211. The focal point detection unit 13L detects a focal point through the image signal in the image memory 211. The focal point detection unit 13R detects a focal point through the image signal in the image memory 111. The operation controlling unit 17 calculates a position of a frame to detect a focal point in the image memory 111. The CPU 11 effects a variety of controlling processes on the basis of arithmetic results inputted from the focal point detection units 13L, 13R and an arithmetic result inputted from the image correlation processing unit 15.

Figure 4:
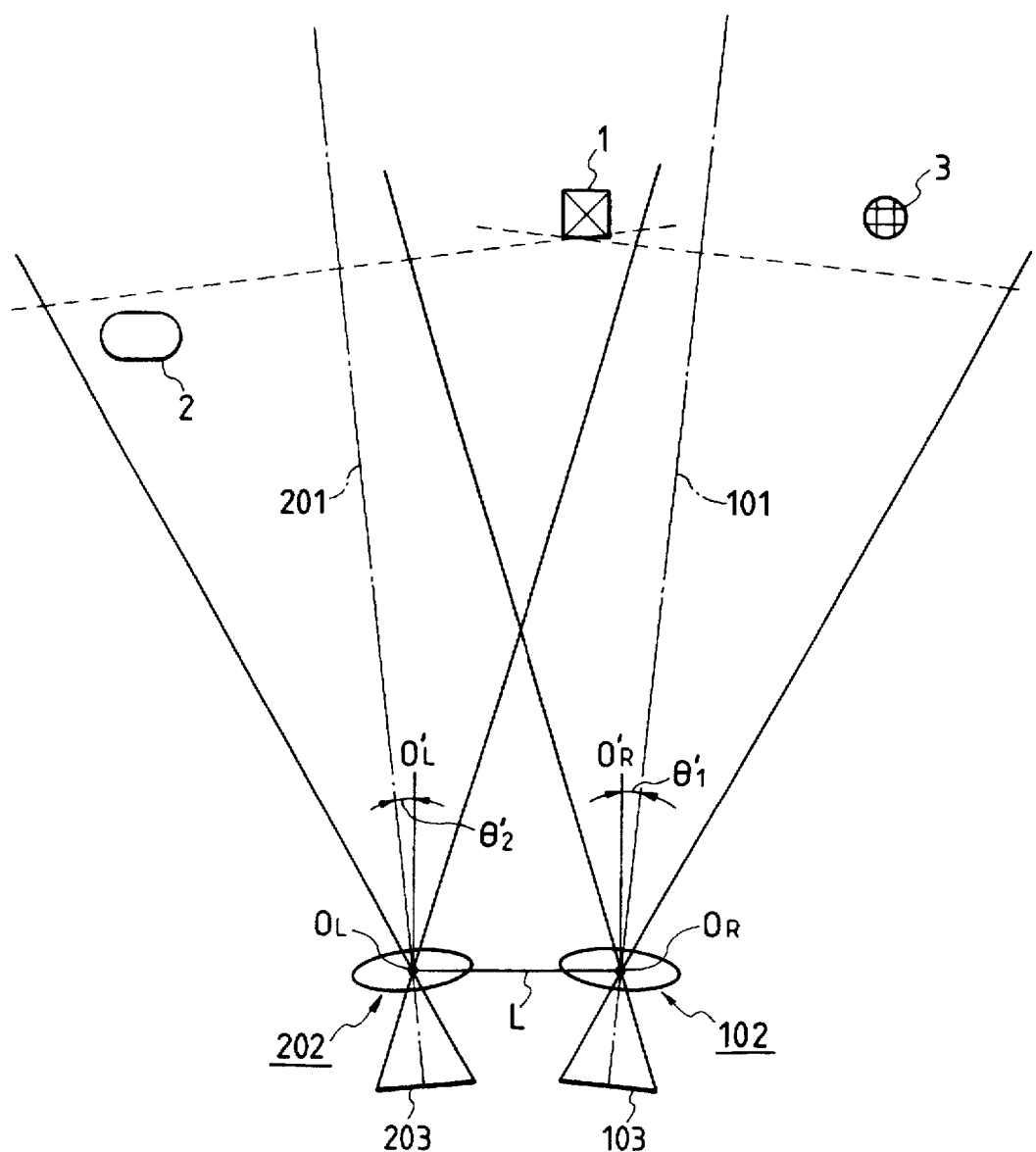
FIG. 4 is a view showing an example of a layout of a multieye imaging system in the first embodiment.
Figure 5A:
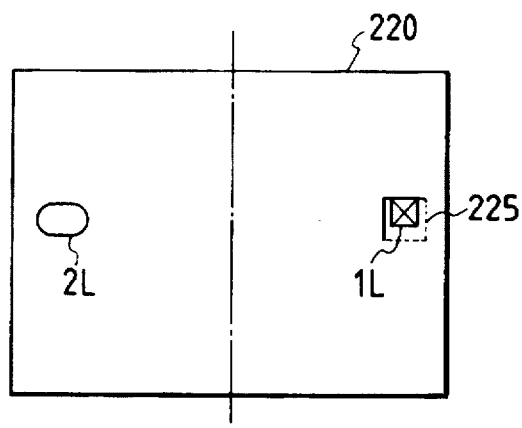
FIGS. 5A and 5B are explanatory views each showing an outline of a frame to detect a focal point in each image.
Figure 5B:
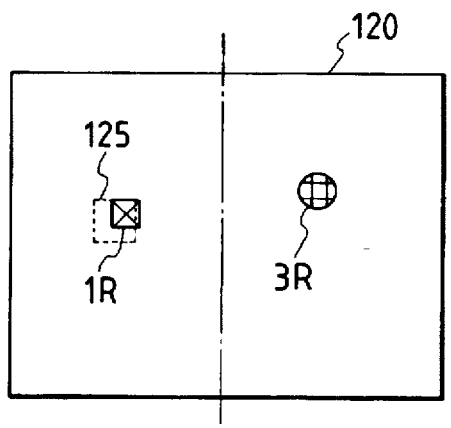

Next, operations of the aspect ratio conversion processing unit 10 will be explained. In FIG. 4, the first, second and third objects 1, 2, 3 existing in the same positions as those in FIG. 1 are each imaged so that convergence angles are formed by $\theta_1'$, $\theta_2'$ ($\theta_1'=\theta_2'$). Note that the convergence angles are regulated by the controlling CPU so to set $\theta_1'=\theta_2'$ all the time. The aspect ratio conversion processing unit 10 converts the analog image signals inputted from the image sensors 103, 203 into digital signals by means of first and second A/D converters 110, 210. The controlling CPU 11 inputs detection signals from the encoders 108, 208, 105, 205 of the pick-up-image optical systems 102, 202. The controlling CPU 11 then performs the control so to make the respective focal lengths and convergence angles coincident with each other at all times. Further, a frame for the focal length is set in an image inputted from the pick-up-image optical system 202 to smoothly execute the correlation operation of an overlapped area for the synthesizing process. A frame position and a frame size may be continuously given by evaluation functions which use parameters f, $\theta_2'$, etc. of the pick-up-image optical system; or the detection frame may also be set beforehand. FIGS. 5A and 5B each show how the detection-of-focus frame is previously set. Referring to FIGS. 5A and 5B, an image 220 outlined therein is inputted from the pick-up-image optical system 202. An image 120 outlined therein is inputted from the pick-up-image optical system 102. In addition, a frame 225 is defined as a detection-of-focus frame set beforehand in the image 220.

Herein, the controlling CPU 11 reads an image signal corresponding to the focal point detecting frame 225 from the second image memory 211 and transmits the signal to the focus detection unit 13L. The focus detection unit 13L detects an in-focus point from the image signal. Shown as one example is a method of effecting the detection by use of an edge width of the image signal.

Figure 6A:
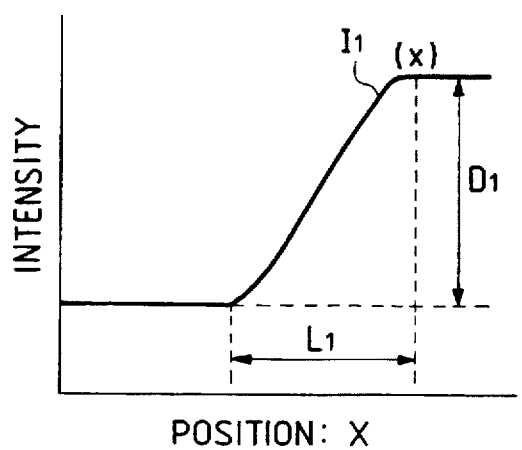
FIGS. 6A and 6B are explanatory views each showing an outline of a method of detecting an edge width.
Figure 6B:
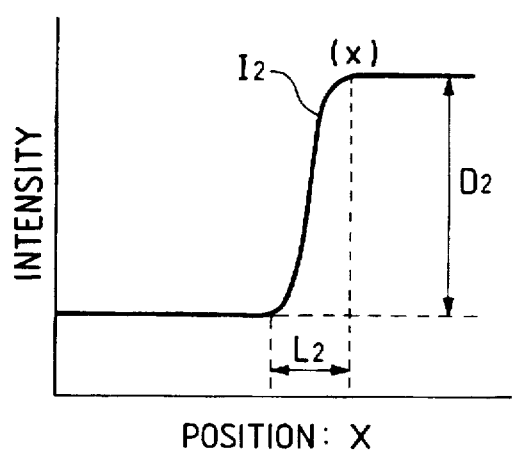

FIGS. 6A and 6B are explanatory graphic charts each showing the method in which the edge width of the image serves as an in-focus point signal. FIG. 6A shows a distribution of intensity at the edge when being out of focus. FIG. 6B shows a distribution of intensity when being in focus.

According to the method in which the image edge width serves as the in-focus signal, the focalization is automatically performed by driving a focus lens to reduce the edge width obtained. This takes an advantage of the fact that the image edge width detected from the image signal obtained by the imaging apparatus increases because of a defocused image when being out of focus but decreases because of no defocused image when being in focus.

Note that an out-of-focus edge width $L_1$ can be obtained by substituting, into the following formula, an edge intensity difference $D_1$ obtained from a : $I_1(x)$ representing an edge intensity distribution shown in FIG. 6A and an edge inclination $dI_1(x)/dx$.

$$L_1 = D_1 / \{dI_1(x)/dx\}$$

Further, an edge width $L_2$ when being in focus can be obtained by substituting, into the following formula, an edge intensity difference $D_2$ obtained from a function $I_2(x)$ representing an edge intensity distribution shown in FIG. 6B and an edge inclination $dI_2(x)/dx$.

$$L_2 = D_2 / \{dI_2(x)/dx\}$$

Herein, the edge inclinations $dI_1(x)/dx$ and $dI_2(x)/dx$ are each obtainable from an average value of inclinations at respective points x from a portion where the edge rises to a portion where the edge again levels out.

The controlling CPU 11 drives the focus motor 206 to reduce the edge width obtained in response to the edge width detection signal outputted from the focus detection unit 13L. An image within the detection-in-focus detection frame 225 in the image 220 is thereby held in an in-focus state. The similar process is to be effected for the image 120. On this occasion, however, it is required that an area corresponding to the image within the detection frame 225 in the image 220 be set in the image 120. This will be explained with reference to FIG. 7.

Figure 7:
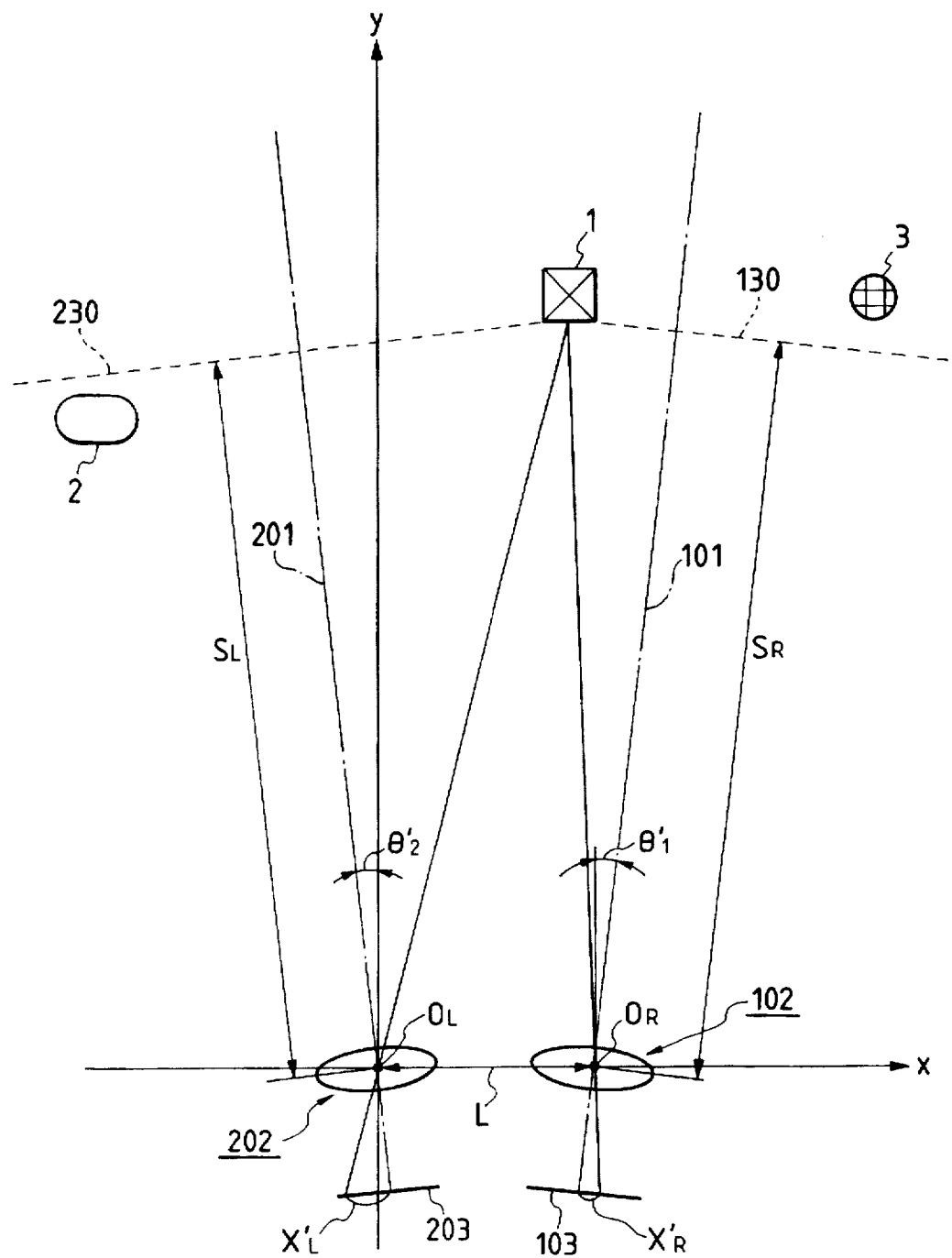
FIG. 7 is a view showing an outline of an imaging relationship in the multieye imaging system.

In FIG. 7, x- and y-axes are set in the schematic view of FIG. 4. Referring to FIG. 7, numeral 230 designates a plane conjugate to the image sensor 203 in the pick-up-image optical system 202; and 130 represents a plane conjugate to the image sensor 103 of the pick-up-image optical system 120.

It is herein assumed that the pick-up-image optical system 202 is in focus on the first object 1 by the above process. The pick-up-image optical system 102 is also in focus on the first object 1. For this purpose, it is necessary to obtain an object distance $S_R$ of the pick-up-image optical system 102. Referring to FIG. 7, from an imaging relationship of the pick-up-image optical system 202, a position (x, y) of the first object can be expressed as functions of an imaging position $x_L$, an object distance $S_L$ a focal length $f_L$ and a convergence angle $\theta_1'$ of the first object 1 in the image sensor 203 of the pick-up-image optical system 202. The expressions are:

$$x = g_x(x_L', S_L, f_L, \theta_1')$$

$$y = g_y(x_L', S_L, f_L, \theta_1')$$

Hence, from a geometrical relationship, an imaging position $x_R'$ of the object 1 in the image sensor of the pick-up-image optical system 102 can be expressed as a function of the imaging position $x_L'$, the object distance $S_L$, the focal length $f_L$, the convergence angle $\theta_1'$ and a baseline length L. The expression is:

$$x_R' = 0 \; g_{xR}(x_L', S_L, f_L, \theta_1', L)$$

where L is the baseline length between the respective pick-up-image optical systems. The controlling CPU 11 outputs the respective parameters described above to the operation processing unit 17. The operation processing unit 17 performs a series of processes, thereby setting a detection-of-focus area 125 in the image 120 depicted in FIGS. 5A and 5B. After setting the detection frame 125, an area corresponding thereto is read from the image memory 111 and transmitted to the focus detection unit 13R. The focus detection unit 13R detects an edge width by the same processing as that in the focus detection unit 13L. The controlling CPU 11 drives the focus motor 106 so that an image within the detection frame 125 is in focus.

Each image in the area receiving the correlation operation processing as done above is always brought into the in-focus state.

Figure 8A:
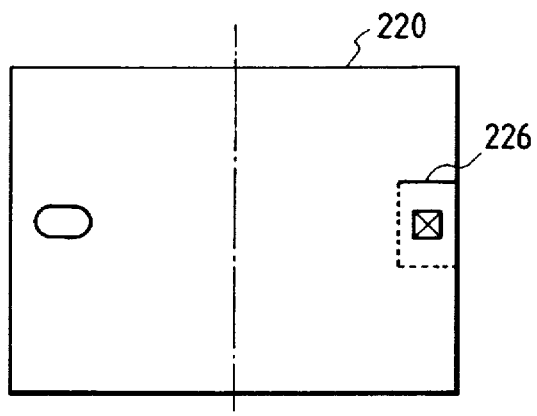
FIGS. 8A, 8B and 8C are views each showing an outline of a correlation operation area.
Figure 8B:
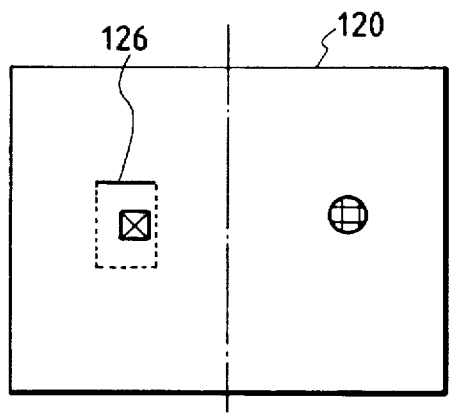
Figure 8C:
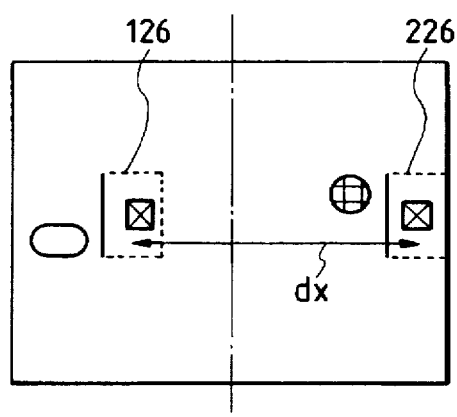
Figure 9A:
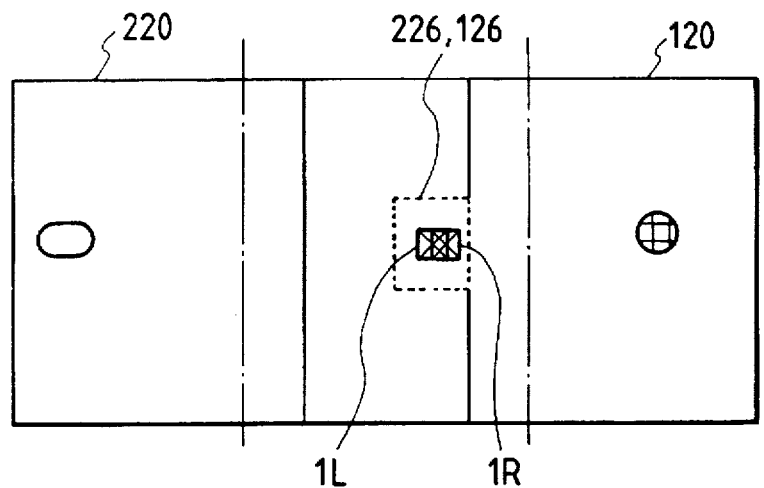
FIGS. 9A and 9B are views each showing an outline of a correlation operation process.
Figure 9B:
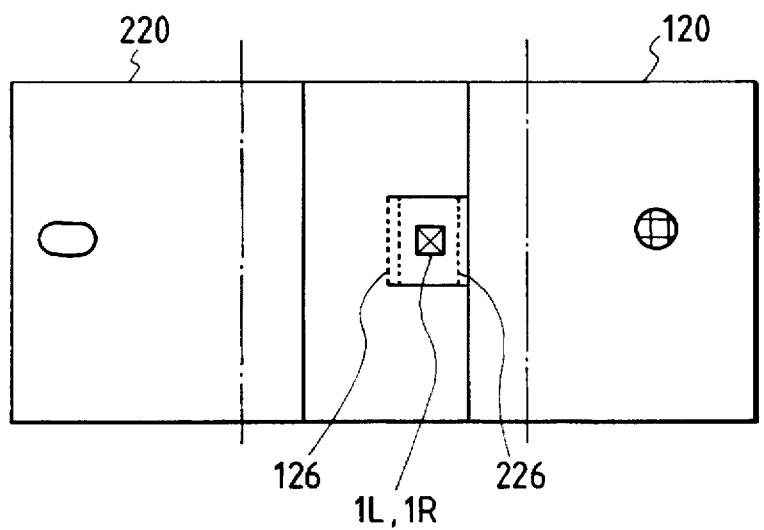

The controlling CPU 11 sets correlation operation processing areas 226, 126 on the basis of the respective detection-of-focus frames 225, 125. FIGS. 8A and 8B illustrate outlines of the correlation operation processing areas 226, 126 set by the digital image signals 220, 120 stored in the image memories 211, 111. FIG. 8C also illustrates an image when the image signals 220, 120 are directly overlapped with each other. Then a deviation dx between the correlation operation processing areas 126, 226 is obtainable from above-mentioned $x_R'$, $x_L'$. FIG. 9A shows a state where the image signals 220, 120 are overlapped so that the correlation operation areas 226, 126 become coincident on the basis of the deviation dx. As illustrated in FIG. 9A, the images (object images 1L, 1R) within the correlation operation areas 226, 126 are not necessarily coincident due to an error or the like of a convergence angle detecting unit of each pick-up-image optical system at this time. Hence, the image correlation processing areas 15 operates the correlation operation processing between the images within the operation areas 226, 126. A more accurate correlation is obtained as shown in FIG. 9B. Note that the correlation operation areas are herein set based on the detection-of-focus frames 225, 125. However, both positions and sizes thereof may be arbitrarily set.

The image correlation processing unit 15 performs the correlation operation by respectively reading the digital image signals from the first and second image memories 111, 211. The correlation operations are executed with respect to the images of the operation areas 126, 226 shown in FIGS. 8A and 8B. A function shown in the following formula is employed as a correlation function. A value obtained by the relevant function is evaluated as a correlation value.

$$I(\theta_1', \theta_2') = \{\int q_1(x, y, \theta_1') \cdot q_2(x, y, \theta_2') dx dy\}/C$$

where $q_1$ is the intensity distribution of the image 1R of the first object 1 through the pick-up-image optical system 111, and $q_2$ is the intensity distribution of the image 1L of the first object through the pick-up-image optical system 211.

$$C = \{\int q_1(x, y, \theta_1')dxdy\} \cdot \{\int q_2(x, y, \theta_2')dxdy\}$$

The correlation function $I(\theta_1', \theta_2')$ expressed by the above formula is a function of the two angles $\theta_1', \theta_2'$ but becomes, as a matter of fact, substantially a function of the convergence angle $\theta_1' + \theta_2'$. FIG. 12 illustrates a correlation value curve obtained by calculating the correlation function I ($\theta_1', \theta_2'$) while varying the convergence angle $\theta_1' + \theta_2'$ in the image correlation processing unit 15. An arithmetic result given by the image correlation processing unit 15 is outputted to the controlling CPU 11. The focusing lens groups 202b, 102b of the respective pick-up-image systems each receive variations of the convergence angle $\theta_1' + \theta_2'$ through the convergence angle motors 104, 204. The variations thereof are read by rotational information detecting units 105, 205 of the convergence angle $\theta_1' + \theta_2'$. The controlling CPU 11 controls these actions and therefore obtains a correlation value curve R shown in FIG. 11. Note that the correlation function may be a function in such a form as to exhibit a coincidence of two images (e.g., to take a difference between the two images) in addition to the correlation function ($\theta_1', \theta_2'$) shown in the above formula.

The controlling CPU 11 finds out a peak of the correlation value by varying the convergence angle $\theta_1' + \theta_2'$ so to increase the correlation value. It follows that the two images 1L, 1R, as shown in FIG. 9B, coincide with each other in a peak position of the correlation value.

Figure 10:
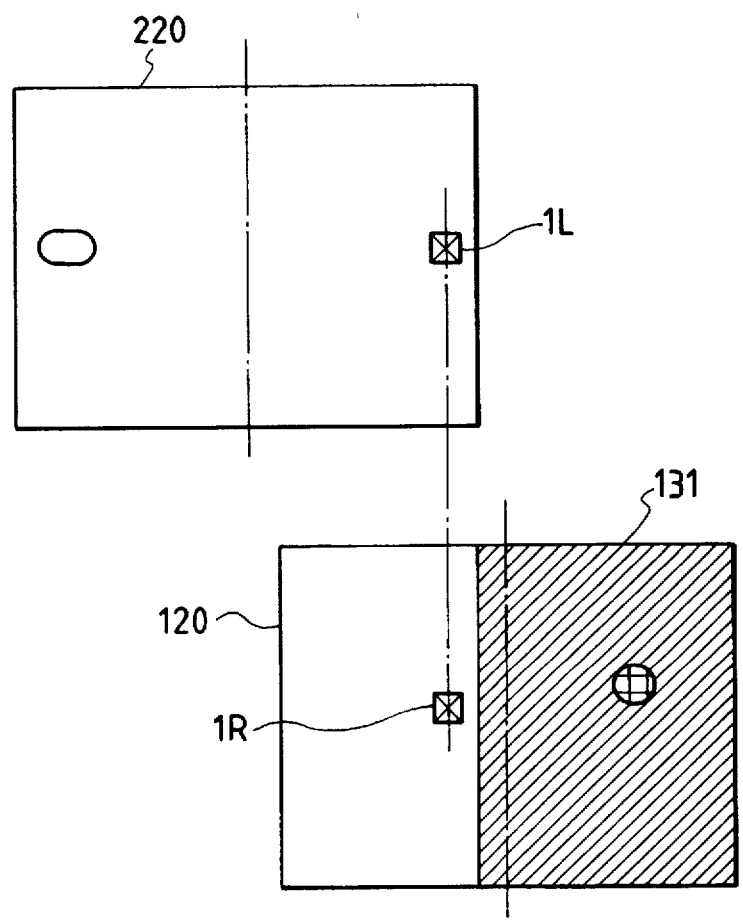
FIG. 10 is an explanatory view showing an outline of a synthesizing process.

The images when the correlation value comes to the peak in the image correlation processing unit 15 are inputted to the image synthesizing processing unit 16 from the image memories 111, 211, respectively. FIGS. 10 and 11 each illustrate an outline of the image synthesizing process. At this time, the image signal 220 of the image memory 211 inputs the entire image area. With respect to the image signal 120 of the image memory 111, however, the controlling CPU 11 reads and outputs a synthesizing process area 131 (hatching area in FIG. 10) to the synthesizing processing unit 16 on the basis of the output result of the image correlation processing unit 15. Note that only the fiducial image (the image 220 in this case) is outputted when outputting an image having the same aspect ratio as that in each of the image sensors 103, 203.

Figure 11A:
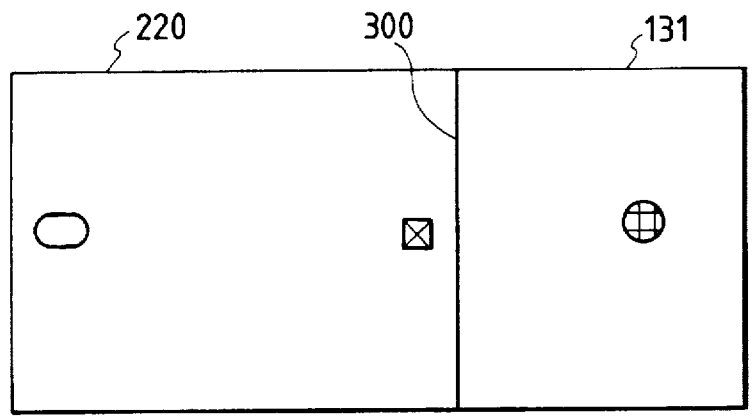
FIGS. 11A, 11B and 11C are explanatory views each showing a seamless process in a synthesizing processing unit.

The synthesizing processing unit 16 generates, as illustrated in FIG. 11A, a single image by joining the image signal 220 to the synthesizing process area 131. If simply joined, however, there may be generated the image in which a boundry line 300 is emphasized due to an influence of a control error and a luminance difference and the like between the pick-up-image systems. Considering this, the process is, as further illustrated in FIG. 11B, conducted to make the seam inconspicuous in a predetermined area (herein termed a seamless area 310). A process based on local smoothing is shown as one method of this process (hereinafter thus described because of being generally called a seamless process).

According to this method, a window W (i, j) is set with a certain image f (x, y) being centered. A calculation output in the following formula is given to a point (x, y).

$$g(x, y) = \sum_{i=1}^{m} \sum_{j=1}^{n} W(i, j) f(x-i, y-j)$$

However, a window size is given by m×n. The window is set as below:

$$W = \frac{1}{9} \begin{bmatrix} 1 & 1 & 1 \\ 1 & 1 & 1 \\ 1 & 1 & 1 \end{bmatrix}$$

Figure 13A:
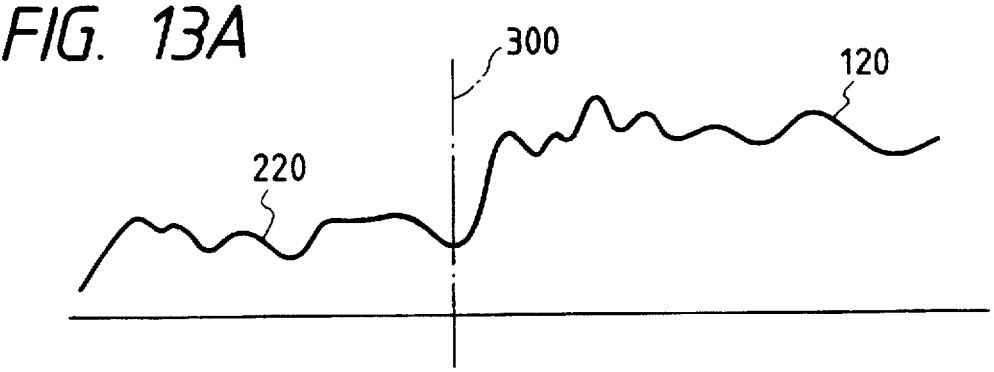
FIGS. 13A and 13B are explanatory views each showing an outline of a smoothing process.
Figure 13B:
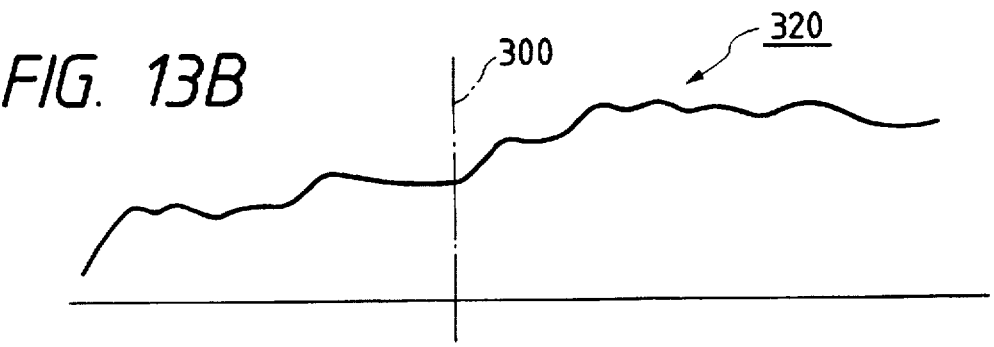

FIGS. 13A and 13B show outlines of the seamless processes of the images obtained by the pick-up-image systems 102, 202 with respect to a string of output values for a certain single line. In the pre-processing image shown in FIG. 13A, the boundary line becomes conspicuous due to a level difference between the output values on the boundary line 300. However, the smoothing process provides an output synthesized image 320 in which the level difference is, as depicted in FIG. 13B, reduced.

In the image synthesizing processing unit 16, the image signal subjected to the synthesizing/seamless processes for the images 120, 220 is outputted as an output synthesized image signal 320.

Figure 11B:
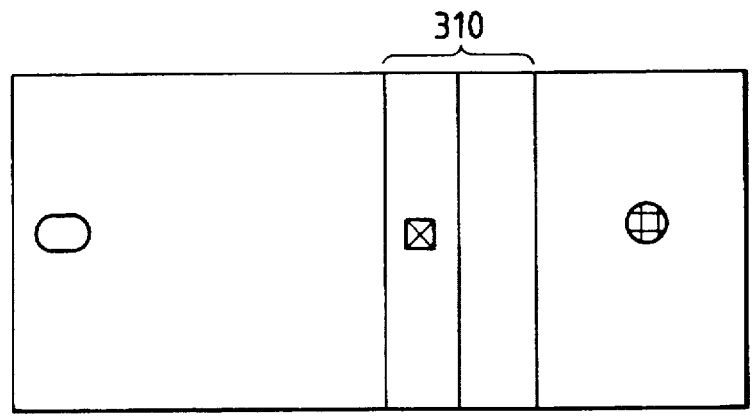
Figure 11C:
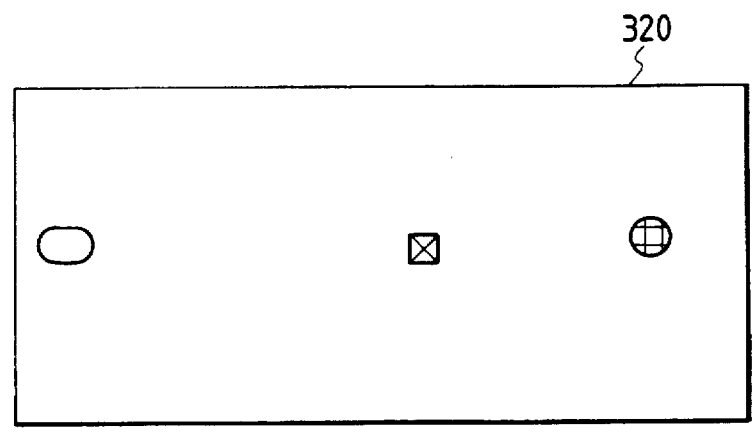
Figure 12:
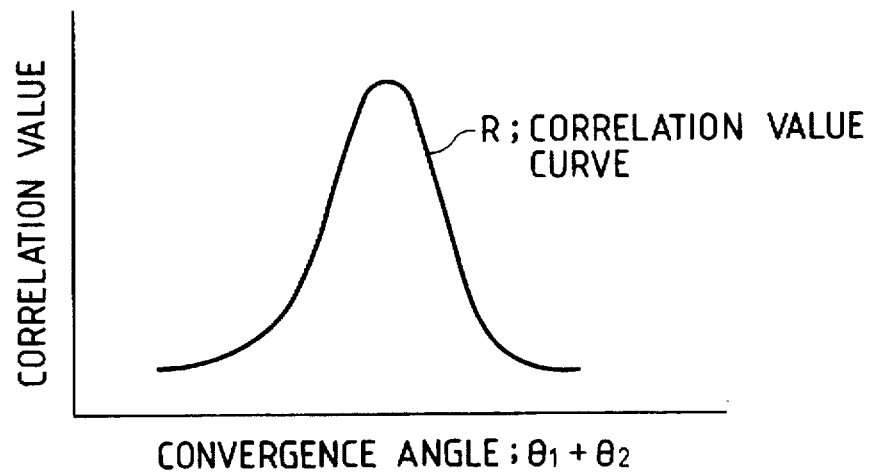
FIG. 12 is an explanatory view showing a correlation function.

As illustrated in FIG. 11C, the output synthesized image signal 320 outputted turns out an image exhibiting a wider aspect than the image signals 120, 220 shown in FIGS. 5A and 5B. Further, as shown in FIG. 11B, the synthesization is effected on the basis of one image, and, therefore, a position of the boundary line comes off the center of the picture, when a panorama operation is employed. Hence, a characteristic is that the image quality of the object at the center of picture is not deteriorated.

Figure 14:
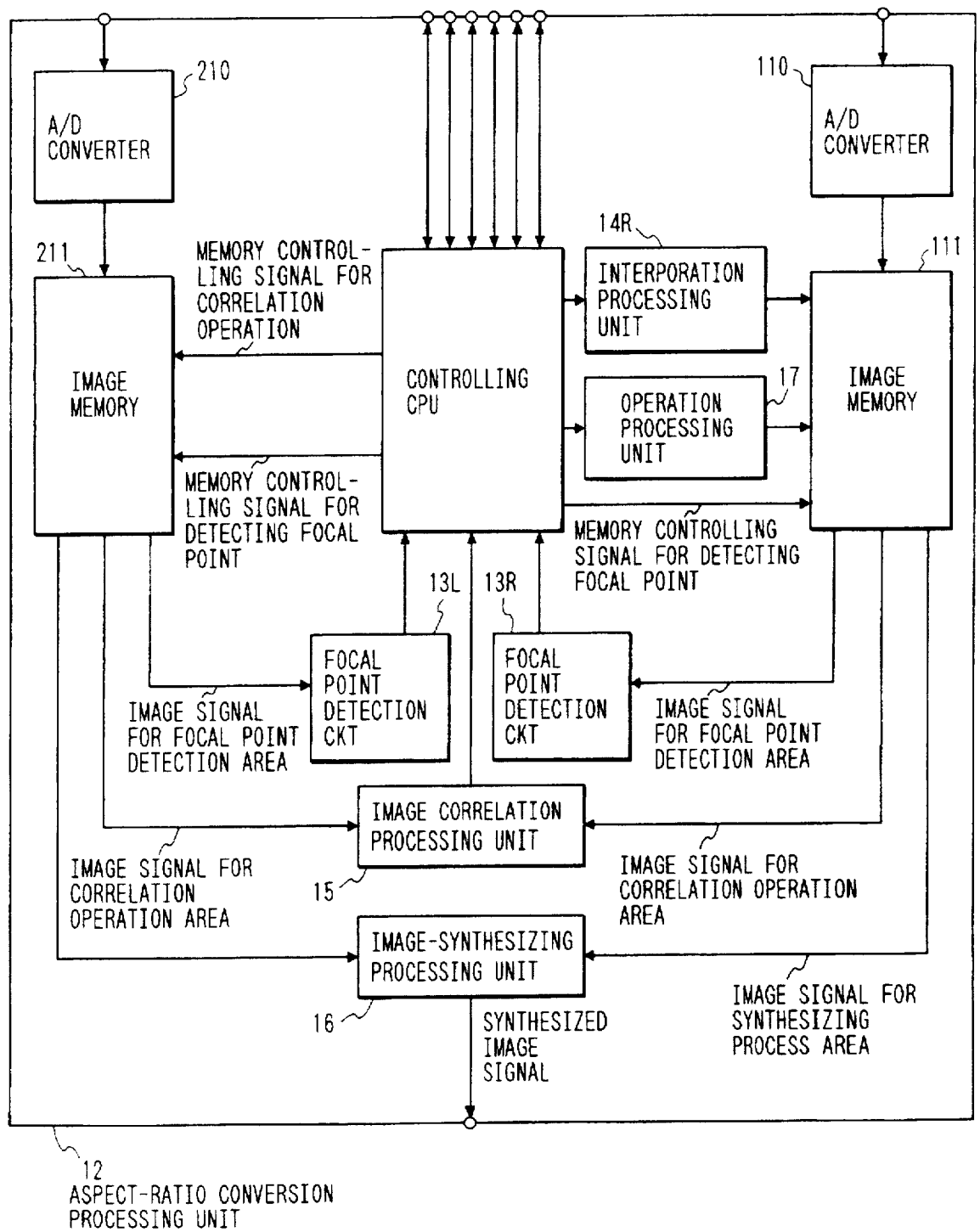
FIG. 14 is a block diagram illustrating an aspect ratio conversion processing unit 12 in a second embodiment of this invention.

FIG. 14 is a schematic block diagram showing a principle of a second embodiment of the multieye imaging apparatus of this invention. Referring to FIG. 14, the same numerals designates the components identical with those in FIG. 2.

In the multieye imaging apparatus in this embodiment, the processing is executed by the same pick-up-image optical systems as the pick-up-image optical systems 102, 202 shown in FIG. 2 and an aspect ratio conversion processing unit 12 of FIG. 14. The aspect ratio conversion processing unit 12 has much the same configuration as that of the aspect ratio conversion processing unit 10 of FIG. 2. However, a difference is that the image signals of the image memories 111, 211 are synthesized after an interpolating process has been done by an interpolation processing unit 14R. Another difference is that the correlation operation processing unit 15 has a different arithmetic content.

The images are accurately aligned when synthesized. Accordingly, the interpolation processing unit 14R interpolates the image signal of the image memory 111. Thereafter, the image correlation processing unit 15 obtains a correlation function from the images of the correlation operation areas 126, 226 illustrated in FIGS. 8A and 8B. Herein, unlike the first embodiment, the image correlation processing unit 15 internally performs the following calculation.

$$\Gamma'(x_0) = \int q_1(x, y) \cdot q_2(x+x_0, y) dx dy$$

where x is the coordinate in an intra-plane direction on the sheet of paper wherein the FIGS. 8A and 8B are shown.

Figure 15:
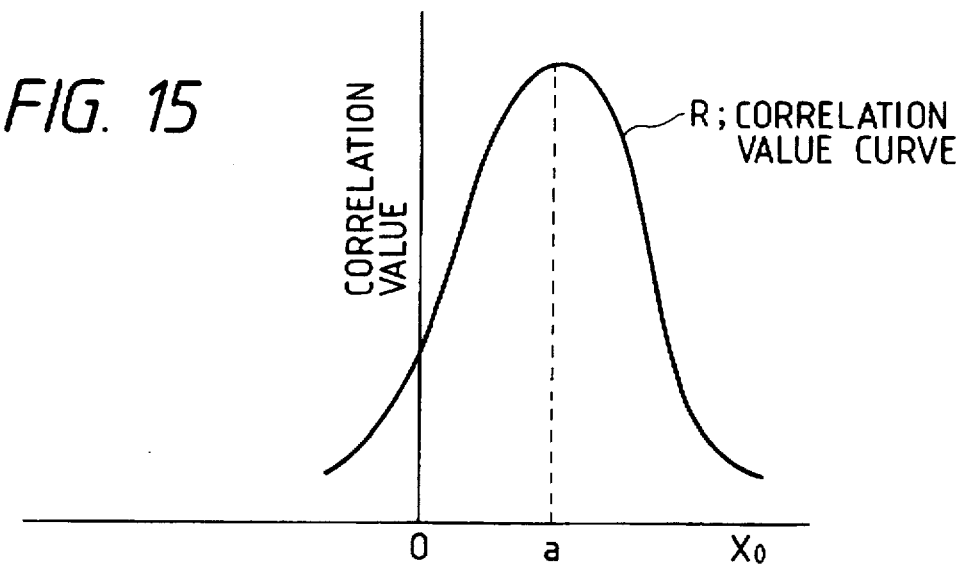
FIG. 15 is an explanatory view showing an outline of a correlation function in the second embodiment.

Note that the correlation value function $\Gamma'(x_0)$ is arithmetically obtained without changing the convergence angles $\theta_1', \theta_2'$ according to the above formula. FIG. 15 shows an arithmetic result of the correlation value function $\Gamma'(x_0)$. The correlation value function $\Gamma'(x_0)$ is a function of $x_0$, while the correlation value curve $R_1$ has a peak when $x_0 = a$.

Figure 16:
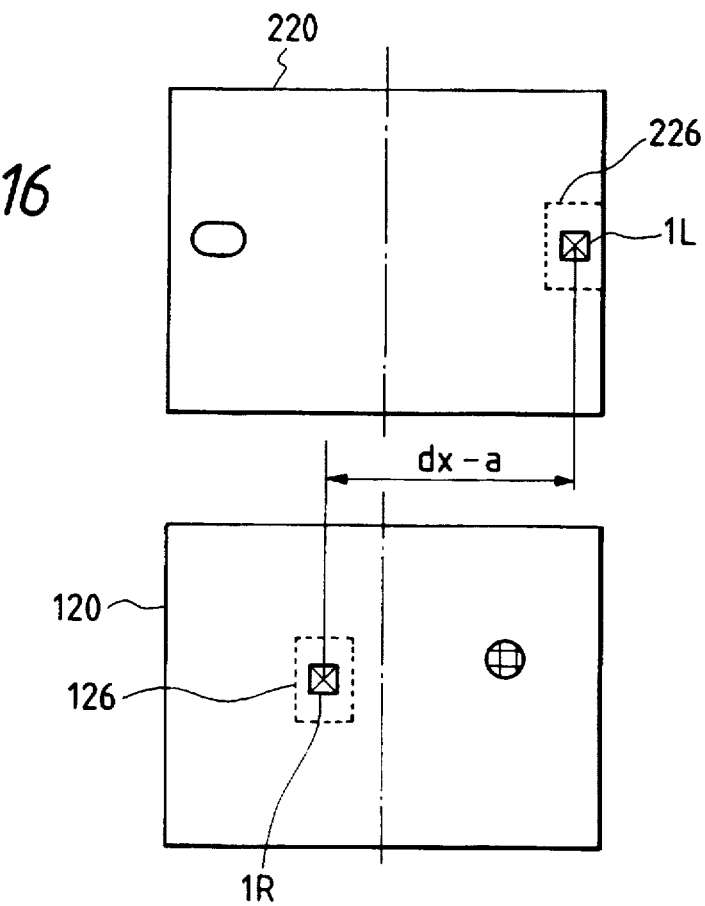
FIG. 16 is an explanatory view showing an outline of a correlation operating process in the second embodiment.
Figure 17:
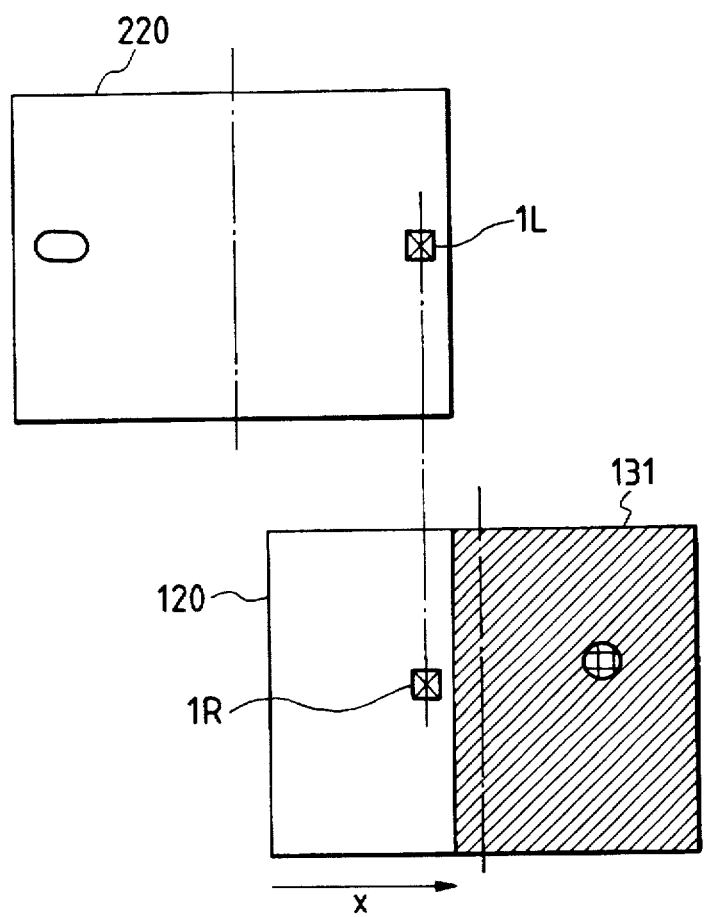
FIG. 17 is a view illustrating an outline of an image synthesizing area.

FIG. 16 shows an outline of a deviation between the images 120, 220, which is obtained by the correlation operating process. The image correlation processing unit 15 outputs, to the controlling CPU 11, a deviation a between the images within the correlation operation areas 126, 226. The controlling CPU 11 obtains a deviation dx−a (see FIG. 16) between the images 220, 120 by use of the above deviation a and a previously obtained deviation dx (see FIG. 8C) between the correlation operation areas 126, 226. Then, an area employed for the synthesizing process is cut out of the interpolated image signal of the image memory 111. FIG. 17 depicts an outline of how the synthesizing area is cut out. The controlling CPU 11, as illustrated in FIG. 17, x-shifts a position to read the data from the image memory 111 on the basis of the deviation quantity between the images 120, 220. The controlling CPU 11 transmits a synthesizing process area 130 to the image synthesization processing unit 16 in the same way with FIG. 10. The image synthesization processing unit 16 synthesizes the image signals by the same method as that in the first embodiment and outputs an image signal having a converted aspect ratio.

Next, a third embodiment will be explained.

Figure 18:
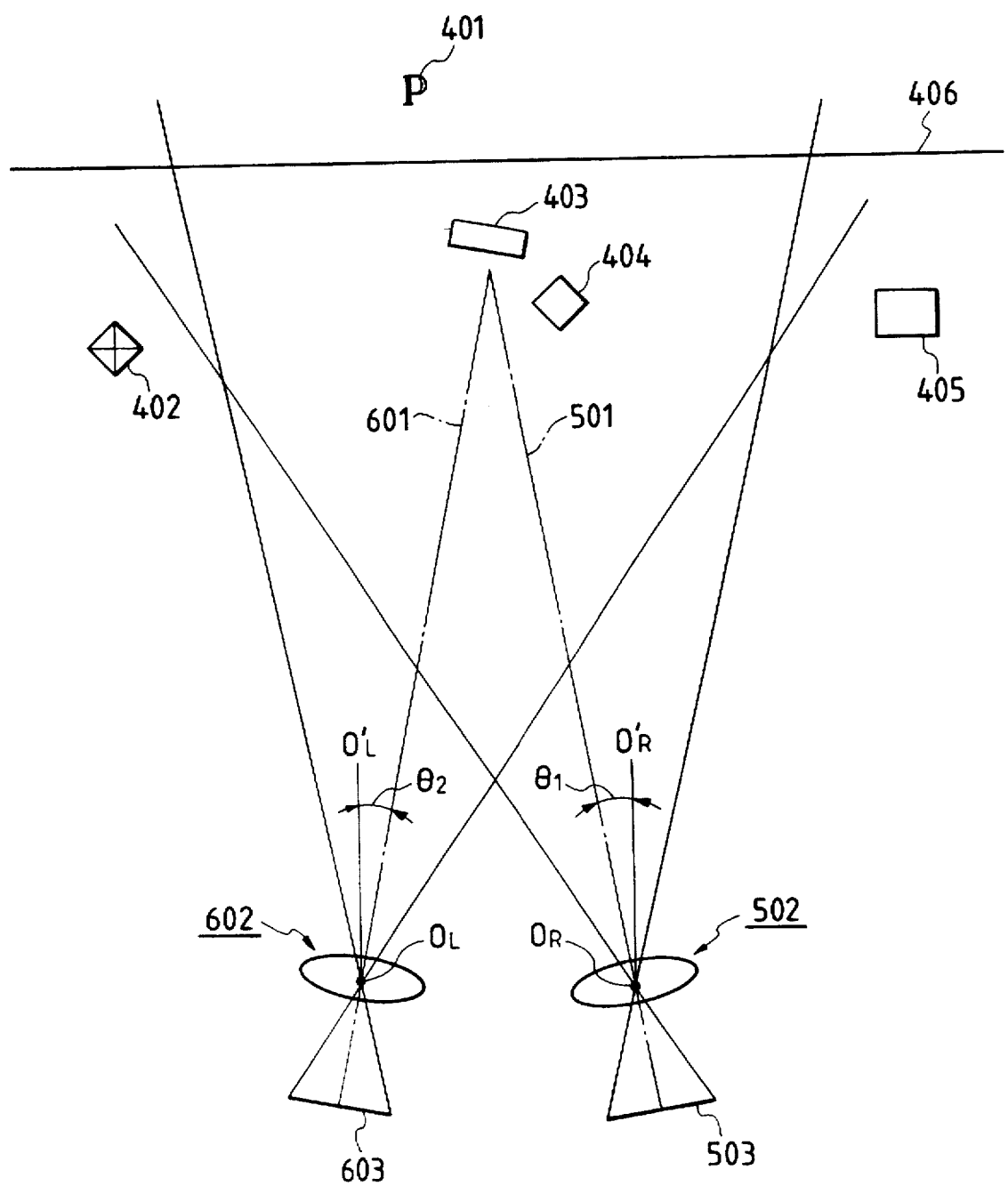
FIG. 18 is a view illustrating a basic layout of the multieye imaging system in a third embodiment of this invention.

FIG. 18 is a view illustrating a basic layout of the multieye imaging apparatus in the third embodiment of this invention. Pick-up-image optical systems 502, 602, image sensors 503, 603 and optical axes 501, 601 are the same as the pick-up-image optical systems 102, 202, the image sensors 103, 203 and the optical axes 101, 201 shown in FIGS. 1 and 2. The pick-up-image optical systems 502, 602 therefore have the configurations illustrated in FIG. 2. In accordance with this embodiment, an object plane 406 is provided in front (upward portion in the FIGURE) of the pick-up-image optical systems 502, 602. A first object 401 is depicted above the object plane 406. Further, second, third, fourth and fifth objects 402, 403, 404, 405 are located in predetermined positions.

Figure 19:
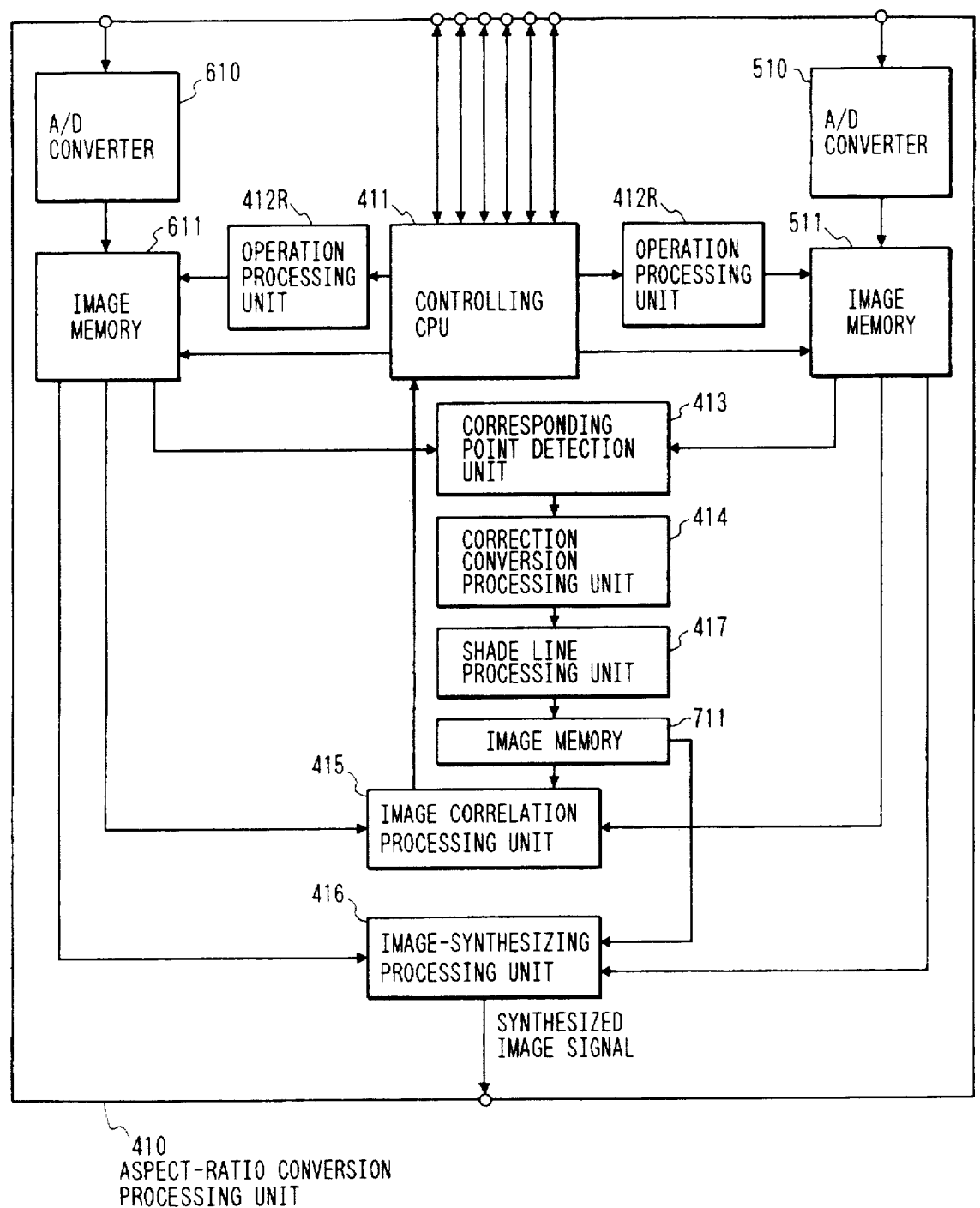
FIG. 19 is a block diagram illustrating an aspect ratio conversion processing unit 410 in the third embodiment.

Next, construction of the aspect ratio conversion processing unit 410 will be explained. As illustrated in FIG. 19, the aspect ratio conversion processing unit 410 comprises first and second A/D converters 510, 610, first and second image memories 511, 611, operation processing units 412L, 412R, a corresponding point detection unit 413, a correction conversion processing unit 414, a shade line processing unit 417, an image memory 711, an image synthesizing processing unit 416, an image correlation processing unit 415 and a controlling CPU 411. The first and second converters 510, 610 convert, analog image signals outputted from the image sensors 503, 603 into digital image signals. The first and second image memories 511, 611 store the digital signals outputted from the respective A/D converters 510, 610. The operation processing units 412L, 412R reconstruct epipolar lines of the image signals. The corresponding point detection unit 413 detects a corresponding point in each image signal. The correction conversion processing unit 414 detects three-dimensional positions corresponding to the respective image signals on the basis of the parameters of the individual pick-up-image systems as well as corresponding to corresponding point detection signals obtained by the corresponding point detection unit 413. The shade line processing unit 417 sequentially writes the thus converted image signals to the image memory from a long-distance object. The image memory 711 stores the corrected image signals. The image synthesizing processing unit 416 performs image-synthesizing from the digital image signals stored in the image memories 511, 611, 711 and outputs the synthesized image signal to the outside. The image correlation processing unit 415 effects an image correlation operation from the digital image signals stored in the image memories 511, 611, 711. The controlling CPU 411 executes a variety of controlling processes on the basis of the arithmetic results inputted from the image correlation processing unit 415.

Figure 20:
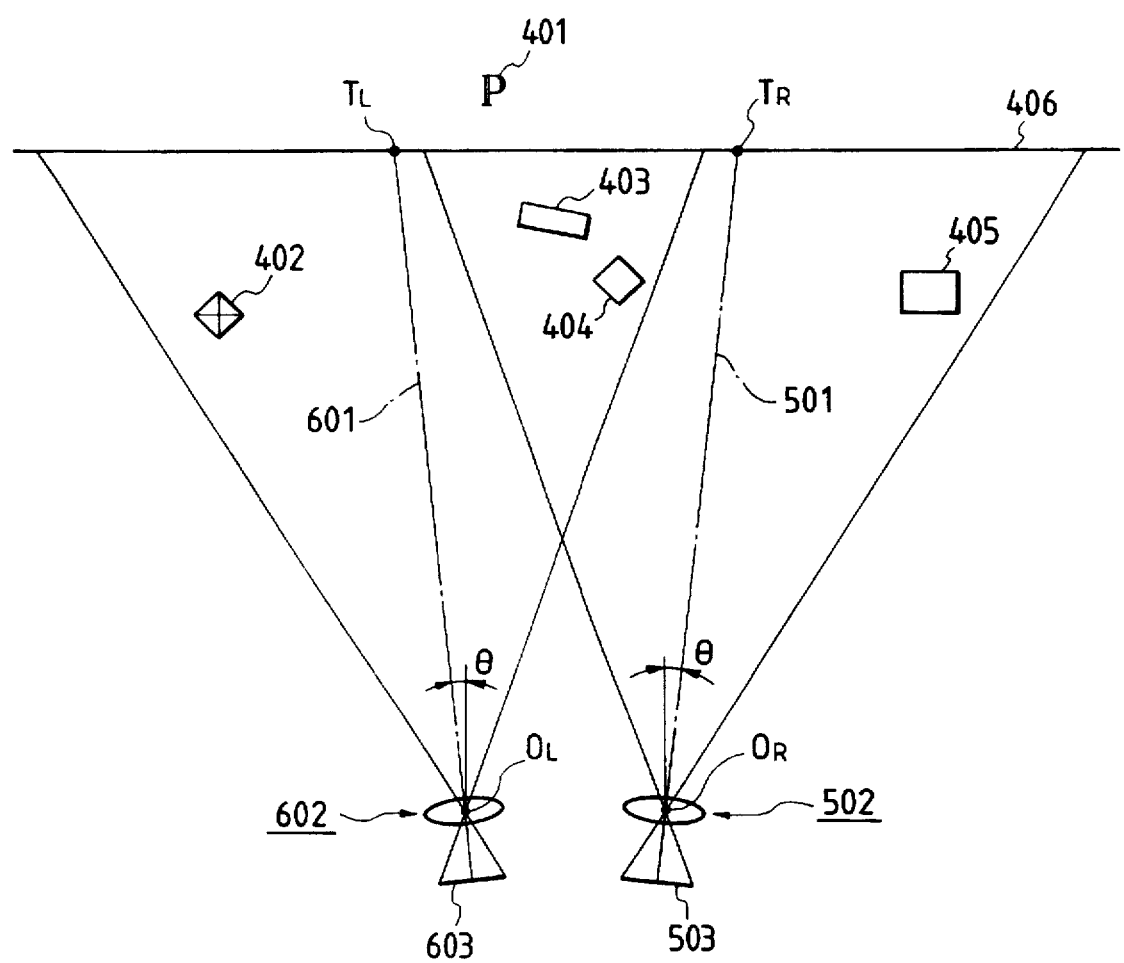
FIG. 20 is a view showing an example of the layout of the multieye imaging system in the third embodiment.
Figure 22A:
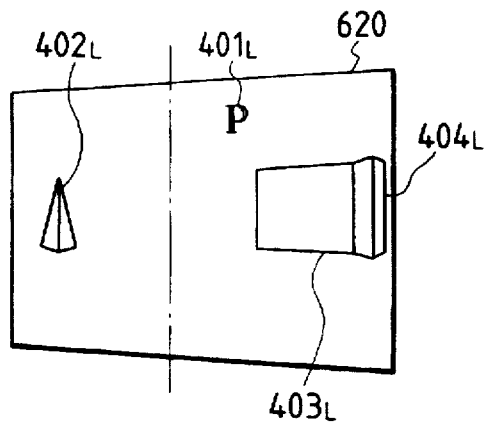
FIG. 22A and 22B are views each schematically illustrating an image obtained by the multieye imaging system in the third embodiment.
Figure 22B:
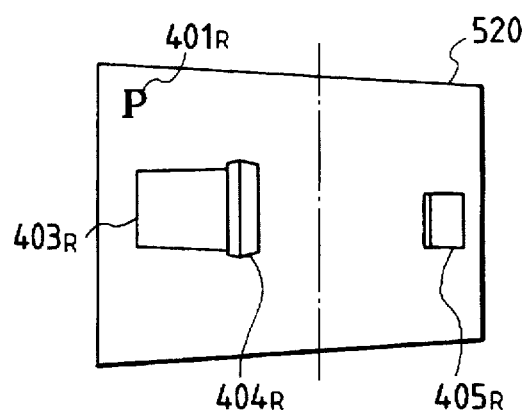

Next, actions of the aspect ratio conversion processing unit 410 will be explained. In FIG. 20, the first, second, third, fourth and fifth objects 401, 402, 403, 404, 405 existing in the same positions as those in FIG. 18 are each imaged by convergence angles $\theta$. The aspect ratio conversion processing unit 410 converts the analog image signals inputted from the image sensors 503, 603 into digital signals by means of first and second A/D converters 510, 610. Further, the controlling CPU 411 inputs detection signals from the encoders 108, 208, 105, 205 (see FIG. 2) of the pick-up-image optical systems 502, 602. The controlling CPU 411 then performs the control to make the respective focal lengths, imaging magnifications and convergence angles coincident with each other at all times. The analog image signals inputted by the image sensors 503, 603 are converted into the digital image signals by the first and second A/D converters 510, 610 and stored in the image memories 511, 611. FIGS. 22A and 22B illustrate outlines of images 520, 620 of the image signals obtained when imaging the above objects 401, 402, 403, 404, 405 in a state shown in FIG. 20. Referring to FIGS. 22A and 22B, the image 520 is defined as an image signal obtained by the pick-up-image optical system 502. The image 620 is defined as an image signal obtained by the pick-up-image optical system 602. Further, images 401, 401R, 402L, 403L, 404L, 403R, 404R, 405R represent images of the objects 401, 402, 403, 404, 405 shown in FIG. 20. When imaged in the state illustrated in FIG. 20, distorted images are formed as shown in FIGS. 22A and 22B due to an influence of the convergence angle $\theta$.

Figure 21:
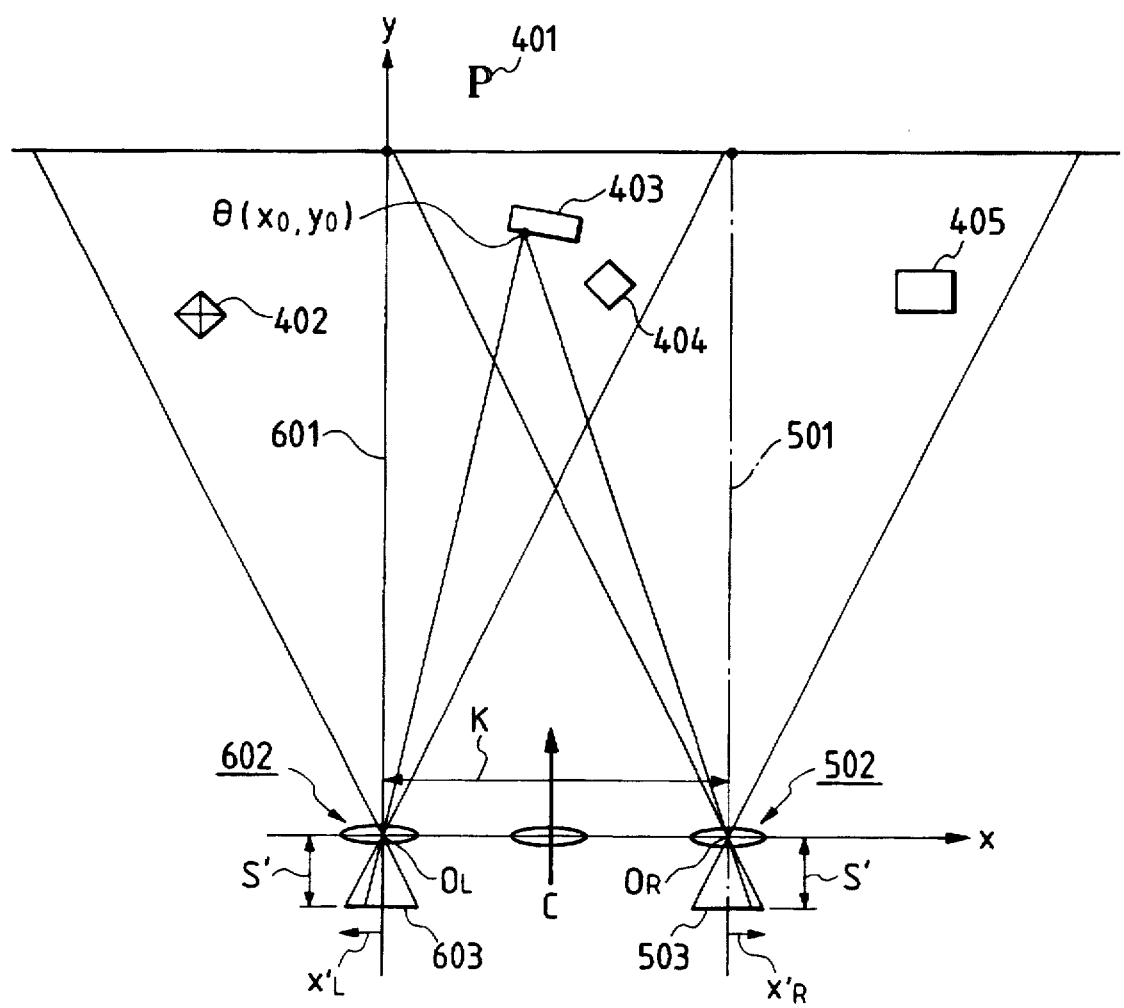
FIG. 21 is an explanatory view showing an outline of the principle of reconstruction of epipolar lines.
Figure 23:
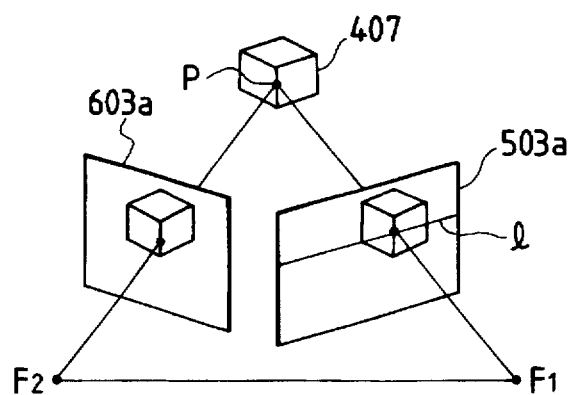
FIG. 23 is an explanatory view showing an outline of the epipolar lines.

FIG. 23 schematically depicts a relationship of the convergence state versus each corresponding point. The pick-up-image systems 502, 602 have their rotational centers $F_1$, $F_2$. The image sensors 503, 603 have their sensor planes 503a, 603a. Note that the sensor planes 503a, 603a are disposed in front of the rotational centers $F_1$, $F_2$ for explanatory convenience. At this time, a plane defined by the rotational centers $F_1$, $F_2$ and three points P on the objects is termed an epipolar plane. Further, an intersection line 1 of the epipolar plane and the sensor plane 503 is called an epipolar line. Hence, when searching a point corresponding to the point P, only the search on the epipolar line 1 of the sensor plane 503a may suffice. The epipolar line 1 is, however, inclined by operation of the convergence. It is required that the epipolar line 1 be reconstructed in order to smoothly search the corresponding point. The epipolar lines in the images 520, 620 shown in FIGS. 22A and 22B are, as stated above, inclined. Consequently, the epipolar lines are reconstructed and converted into horizontal lines by means of the operation processing units 412L, 412R. A converting method herein involves reconstructing the image by a projective conversion as shown in FIG. 21. This intends the transformation into the images when imaged (the state of FIG. 21) by imaginarily rotating the optical axes 501, 601 of the pick-up-image systems 502, 602 shown in FIG. 20 about the rotational centers $O_L$, $O_R$ of the pick-up-image systems 502, 602 by the angle $\theta$.

The controlling CPU 411 obtains distances S′ from the planes of the image sensors 503, 603 to the rear-side principal points of the lenses from the detection signals transmitted from the respective encoders of the pick-up-image systems 502, 602. The controlling CPU 411 transmits the signals to the operation controlling units 412L, 412R in combination with the signals from the rotational angle information detecting units 105, 205 (see FIG. 2).

A coordinate position x', y' the conversion can be obtained as functions of the distances S' from the sensor planes to the rear-side principal points of the lenses, the convergence angle θ and the coordinates x and y on the sensor planes. The position is:

$$x' = g_x(S', \theta, x) \quad (1)$$

$$y' = g_y(S', \theta, y) \quad (2)$$

Figure 24A:
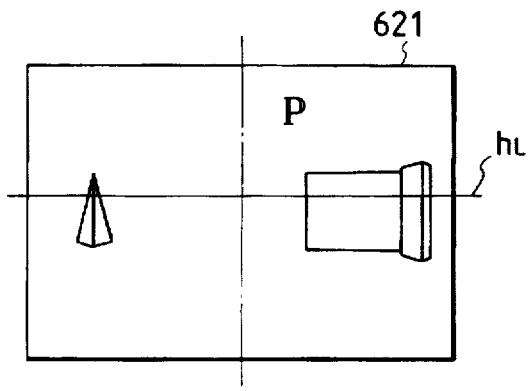
FIGS. 24A and 24B are schematic views showing images in which the epipolar line reconstructing processes are effected about the images of FIGS. 22A and 22B.
Figure 24B:
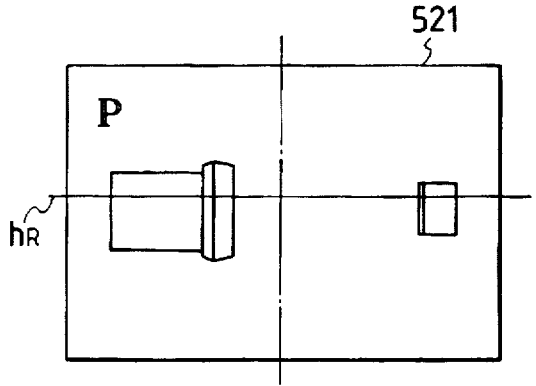

Accordingly, the operation controlling units 412R, 412L calculate the coordinate position after the conversion in accordance with the formulae (1), (2). The operation controlling units 412R, 412L transform the image signals of the image memories 511, 611. FIGS. 24A and 24B schematically illustrate those into which the images 520, 620 of FIGS. 22A and 22B are transformed by the operation controlling units 412R, 412L. Turning to FIGS. 24A and 24B, the transform processing unit 412L converts the image 620 of FIG. 22A into an image 621. The transform processing unit 412R converts the image 520 of FIG. 22B into an image 521. Horizontal lines $h_L$, $h_R$ of FIGS. 24A and 24B are shown by way of one examples of the reconstructed epipolar lines in the images 621, 521.

The image signals converted by the operation controlling units 412R, 412L are rewritten to the image memories 510, 610.

The corresponding point detection unit 413 detects a corresponding points on the epipolar lines between the reconstructed images. As illustrated in FIGS. 24A and 24B, the epipolar lines are reconstructed to be changed the horizontal lines. The corresponding points may be, if the influence by a detection error or the like is ignorable, detected between the image signals on the same horizontal lines, e.g., the horizontal lines $h_L$, $h_R$ of FIGS. 24A and 24B.

One of methods of detecting the corresponding point is a template matching method. According to this method, a template surrounding one point existing in the right image is assumed. The corresponding point is determined by a comparison of similarity in the left image with respect to an image of the template. The corresponding point detection unit 413, as expressed by the formula (3), takes a cross-correlation between a pixel value in the image of the template and a pixel value on the search image. Coordinates at which the maximum value is reached are set as coordinates of the corresponding point. In the cross-correlation of the formula (3), the maximum value is 1.

$$\sigma(x', y') = \frac{\Sigma\Sigma\{L(i,j) \cdot R(i-x', j-y')\}}{\sqrt{\Sigma\Sigma L^2(i,j)} \cdot \sqrt{\Sigma\Sigma R^2(i-x', j-y')}} \quad (3)$$

where L and R are the pixel values of the reconstructed images 521, 621 of the epipolar lines, and σ(x', y') is the degree of the correlation. Note that x', y' represent the coordinates.

The corresponding point detection unit 413 extracts coordinates corresponding to the respective pixel values of the image 621 from the image 521 by the above-mentioned process. The corresponding point detection unit 413 transmits the coordinate value of the corresponding point to a correction conversion unit 414. The correction conversion unit 414 performs a coordinate conversion process on the basis of the coordinate value of the image 521 which corresponds to the respective pixel values of the image 621 that are obtained by the corresponding point detection unit 413, thereby converting a line-of-sight direction.

As discussed above, the images 520, 620 are converted into the images 521, 621 of the system in which imaging is done by the operation controlling units 412R, 412L in the state shown in FIG. 21. Referring to FIG. 21, k represents a length of the baseline, and $x_R'$, $x_L'$ designate coordinates of image points on the image sensors 503, 603 with respect to an object point Q on the object 404. Further S' denotes a distance from the rear-side principal point of the lens to the sensor plane.

The correction conversion processing unit 414 calculates a three-dimensional position of the corresponding point on the basis of the principle of trigonometric measurement by effecting the following calculations:

$$x_O = -Kx_L'/(x_R' - x_L')$$

$$y_O = -KS'/(x_R' - x_L')$$

where K is the length of the base line. $x_R'$, $x_L'$ are the coordinates of the corresponding point, and S' is the distance from the rear-side principal point of the lens to the sensor plane.

Incidentally, the coordinates are such that the origin is a lens center $O_L$ of the pick-up-image optical system 602, and the x- and y-axes are set as shown in FIG. 21.

The shade line processing unit 417 converts an image of an overlapped area into an image as imaged in the direction of a perpendicular bisector C (line of sight) of the baseline length K on the basis of the three-dimensional position information obtained in the correction conversion processing unit 414.

At this time, the objects receive the conversion process sequentially from the one located at the long distance and written to an image memory 711. The object located at the long distance is subjected to a shade-line process by performing sequential overwriting.

Figure 25A:
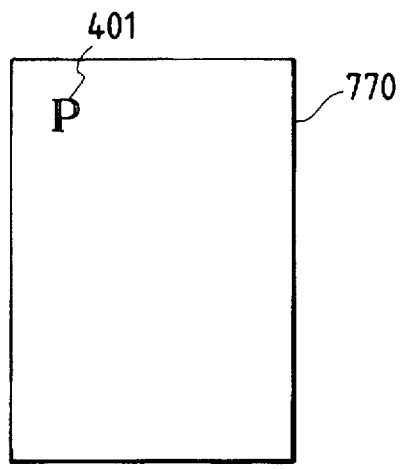
FIGS. 25A, 25B and 25C are explanatory views each showing an outline of shade line processing.
Figure 25B:
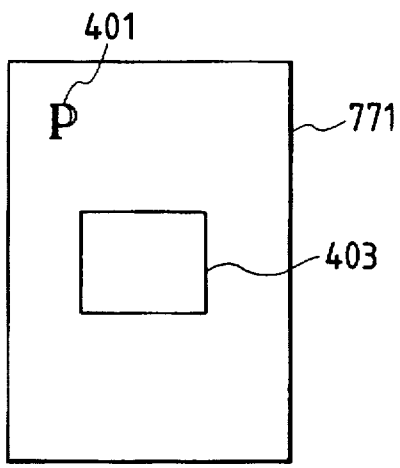
Figure 25C:
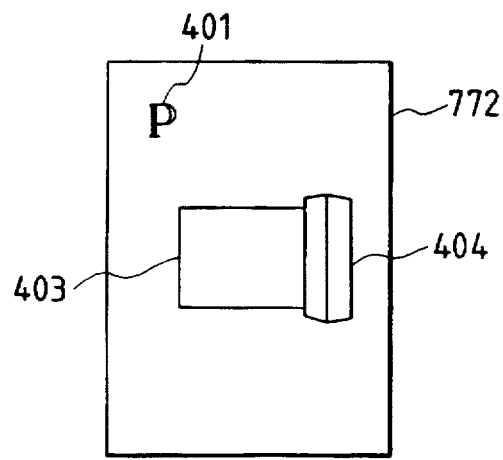

FIGS. 25A, 25B and 25C illustrate outlines of the processes in the shade-line processing unit 417. Referring to the same FIGURES, an image 770 is an outline of the image written to the image memory 711 by converting the object plane (see FIG. 21) including the first object 401 located at the longest distance. An image 771 is an image obtained by transforming the object 403 and overwriting it to the image memory 711. An image 772 is an image obtained by converting the object 404 and overwriting it to the image memory 711. The image 772 is written to the image memory 711.

The image correlation processing unit 415 reads the reconstructed images 521, 621 of the epipolar lines and the image 772 into which the image in the overlapped area is transformed. The image correlation processing unit 415 performs the correlation operation between the image 772 and the images 521, 621. The function shown in the following formula is employed as a correlation function. A value obtained by this function is evaluated as a correlation value.

$$\Gamma(x_1) = \frac{\Sigma\Sigma\{A(i,j) \cdot R(i-x_1, j)\}}{\sqrt{\Sigma\Sigma A^2(i,j)} \cdot \sqrt{\Sigma\Sigma R^2(i-x_1, j)}}$$

where A is the pixel value of the image 772, and R is the pixel value of the image 521. A similar process is also conducted between A and L (a pixel value of the image 621).

Figure 27:
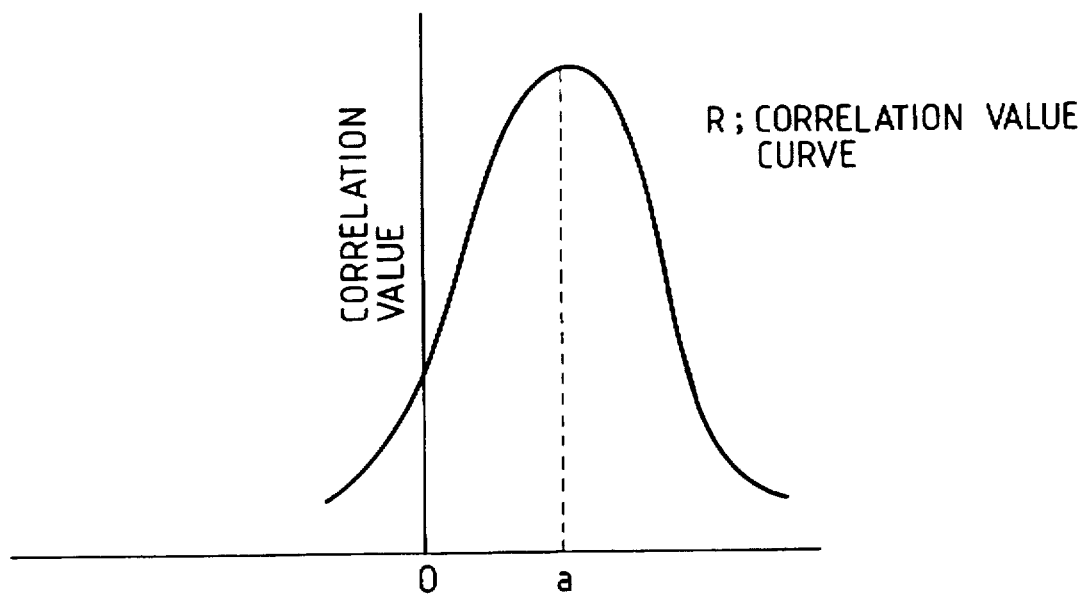
FIG. 27 is a graphic chart illustrating one example of a correlation value curve.

FIG. 27 shows one example of an arithmetic result of the correlation value function $\Gamma(x_1)$. The correlation value function $\Gamma(x_1)$ is a function of $x_1$. The correlation value curve $R_1$ has a peak value when $x_1 = a$.

Figure 26A:
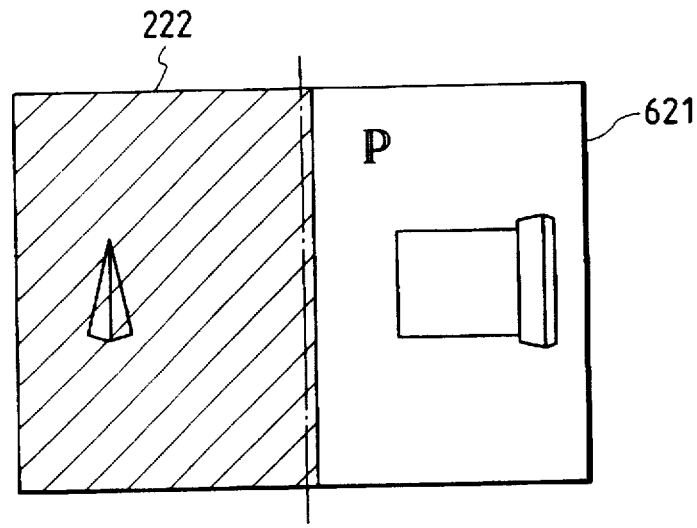
FIGS. 26A and 26B are explanatory views each showing an outline of a synthesizing process.
Figure 26B:
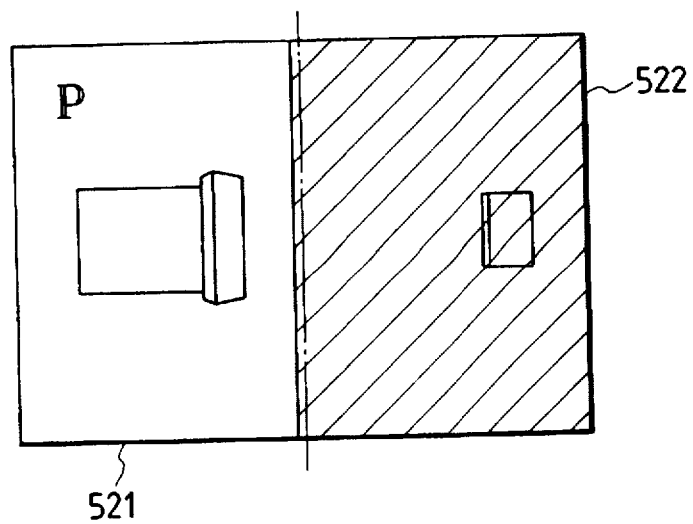

FIGS. 26A and 26B illustrate extracted image areas used for the synthesizing process from the images 521, 621 on the basis of the result obtained by the image correlation processing unit 415. Referring to FIGS. 26A and 26B, an image 522 (a hatching area of the image 521) and an image 622 (a hatching area of the image 621) represent image areas employed for the synthesizing process.

Figure 28:
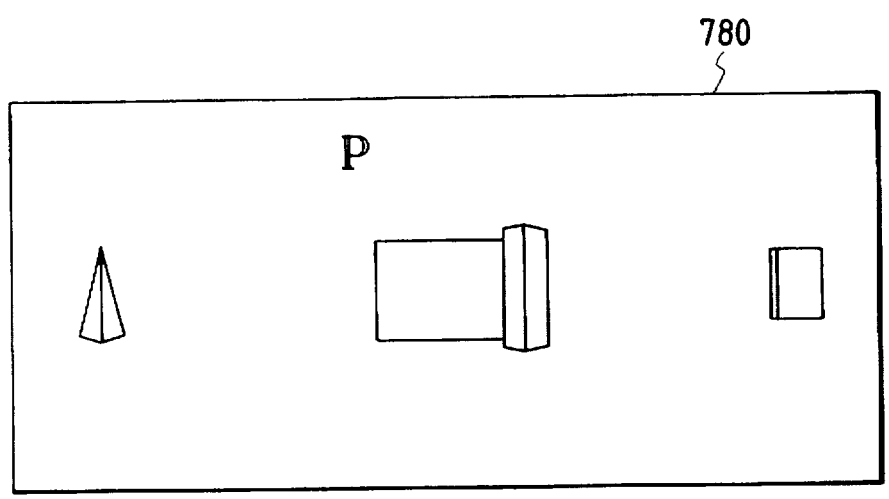
FIG. 28 is a view schematically illustrating a synthesized image.

The image synthesizing processing unit 416 removes an overlapped area with the image 772 from the images 521, 621 on the basis of the correlation processing result between the image 772, the image 521 and the image 621. The image synthesizing processing unit 416 extracts the image areas 522, 622 employed for the synthesizing process. Then, the extracted images 522, 622 and the image 722 are synthesized. As illustrated in FIG. 28, an image 780 having a converted aspect ratio is thereby generated and outputted.

Figure 29A:
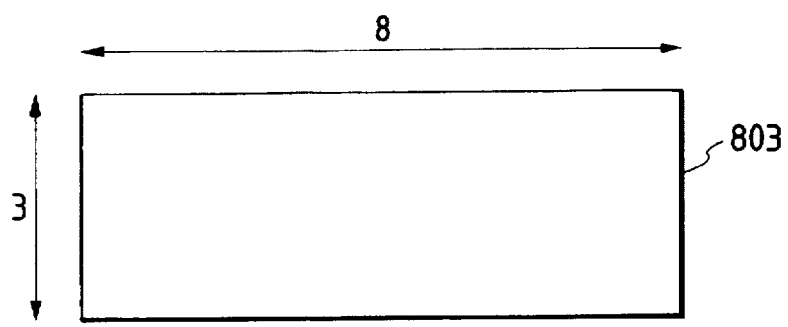
FIGS. 29A to 29C are explanatory views showing variable aspect ratio image outputting in the multieye imaging apparatus in the third embodiment of this invention.
Figure 29B:
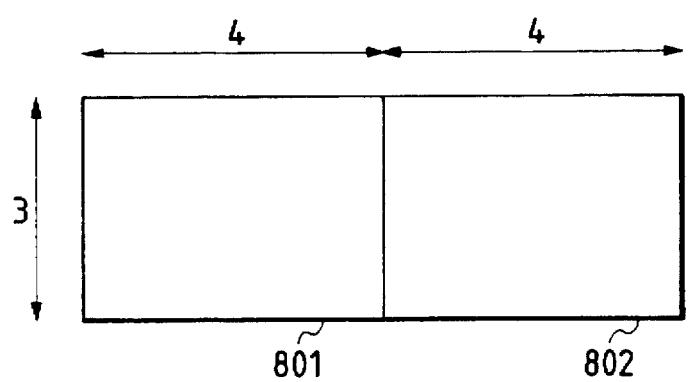
Figure 29C:
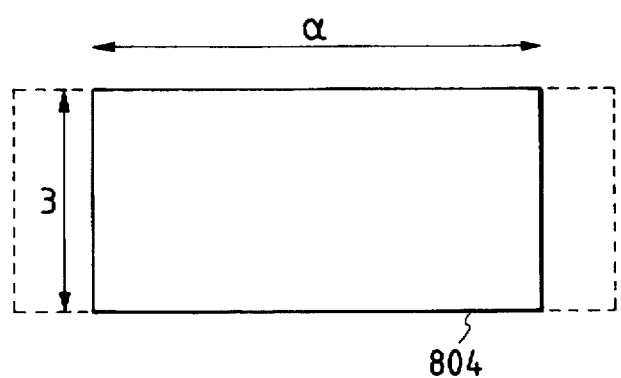

FIGS. 29A, 29B and 29C each show a relationship between a synthesized image formed by the plurality of pick-up-image systems and a variable aspect ratio image trimming-outputted therefrom in a fourth embodiment involving the use of the multieye imaging apparatus capable of outputting the variable aspect ratio image according to this invention. This embodiment involves the use of CCD imaging devices of an aspect ratio of 3:4 and two sets of pick-up-image systems comprising imaging optical systems corresponding to the respective CCD imaging elements. The pick-up-image systems are arranged so that the optical axes thereof exist on the same plane. Details of the apparatus will be mentioned later. Paying attention to FIG. 29A, an area 803 (aspect ratio 3:8) exhibiting the maximum image field is formed by synthesizing two areas 801, 802 (aspect ratio 3:4) corresponding to the two sets of pick-up-image systems shown in FIG. 29B. As illustrated in FIG. 29C, an output image area 804 is determined based on a trimming signal (aspect ratio 3:α) inputted and set by a photographer.

Figure 30:
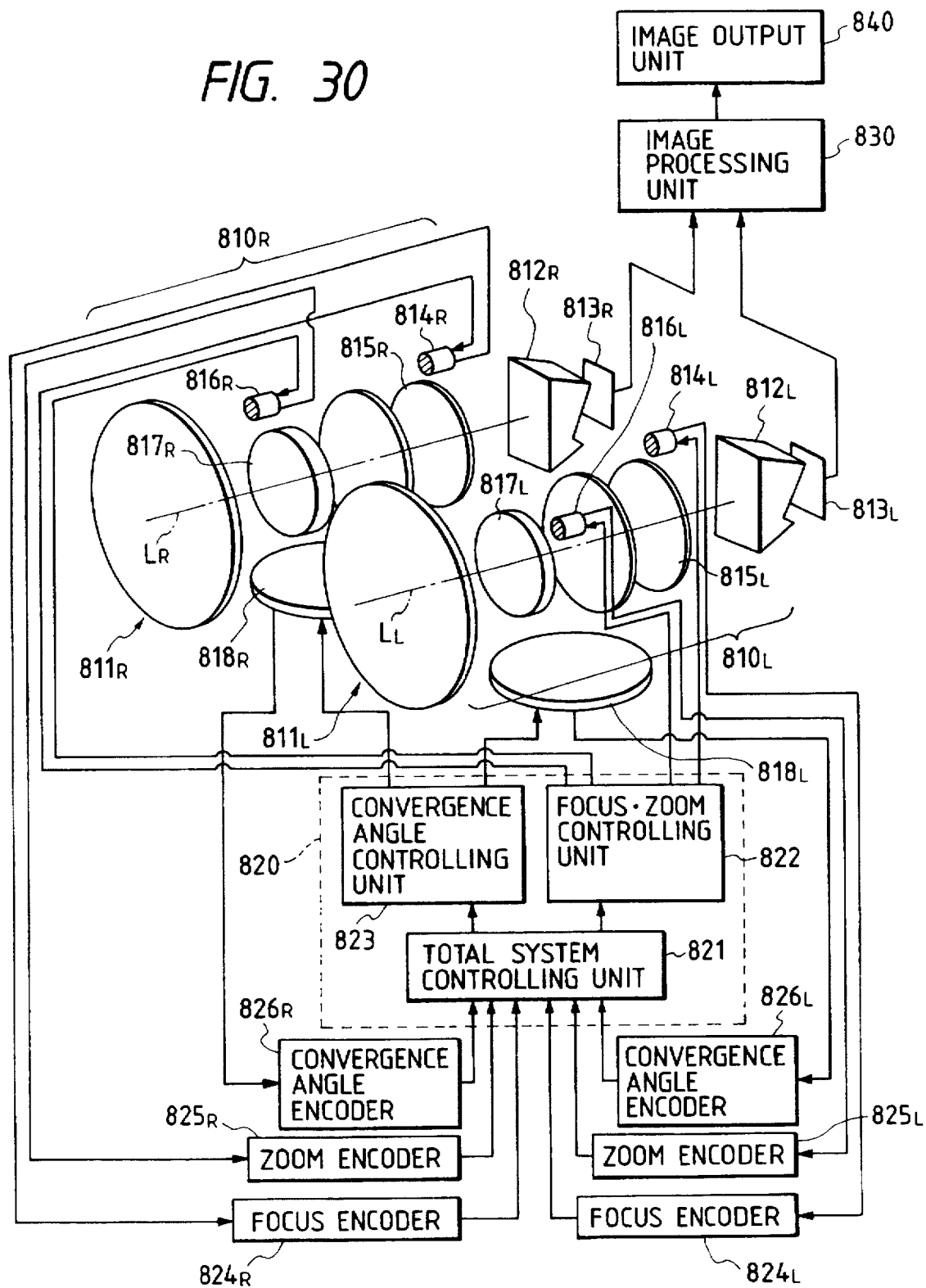
FIG. 30 is a view illustrating principal constructive units of the multieye imaging apparatus in the third embodiment.

FIG. 30 is a schematic block diagram of the multieye imaging apparatus in this embodiment. The multieye imaging apparatus in this embodiment is constructed to obtain one panoramic synthesized image by connecting two images in parallel, which are formed by imaging the objects by use of two pick-up-image systems, i.e., a right pick-up-image system $810_R$ and a left pick-up-image system $810_L$.

To start with, the left pick-up-image system $810_L$ will be explained. The left pick-up-image system $810_L$ includes a pick-up-image lens group $811_L$, a color separation prism $812_L$ and three pieces of CCD sensors $813_L$ (only one sensor is illustrated). The pick-up-image lens group $811_L$ is defined as an imaging optical system incorporated into an unillustrated lens barrel. The color separation prism $812_L$ mounted in this pick-up-image lens group $811_L$ separates beams of light from the objects into three primary colors. The CCD sensors $813_L$ are defined as imaging devices provided for each beam of light separated by the color separation prism $812_L$. The CCD sensors $813_L$ each have a rectangular effective light receiving element. The pick-up-image lens group $811_L$ is constructed of a plurality of lenses including a focusing lens group $815_L$ driven by a focus motor $814_L$ and a variable power lens group $817_L$ driven by a zoom motor $816_L$. The motors $814_L$, $816_L$ are respectively driven corresponding to control signals transmitted from a total system controlling unit 821 and a focus zoom controlling unit 822 within a control unit 820 for controlling the optical systems. On the other hand, the right pick-up-image system $810_R$ is similarly constructed in the same way with the left pick-up-image system $810_L$. An optical axis $L_R$ of the right pick-up-image system $810_R$ exists on the same plane as an optical axis $L_L$ of the pick-up-image lens group $811_L$ of the left pick-up-image system $810_L$.

Further, the respective lens barrels incorporating the pick-up-image lens groups $811_L$, $811_R$ are connected to rotary shafts of convergence angle motors $818_L$, $818_R$. The motors $818_L$, $818_R$ are driven corresponding to the control signals from a convergence angle controlling unit 823 of the control unit 820. The rotary shafts of the convergence angle motors $818_L$, $818_R$ extend in a direction perpendicular to the plane including the optical axes $L_L$, $L_R$ of the two pick-up-image lenses $811_L$, $811_R$. The convergence angle motors $818_L$, $818_R$ are driven, whereby the pick-up-image lens groups $811_L$, $811_R$ are rotated together with the color separation prisms $812_L$, $812_R$ and the CCD sensors $813_L$, $813_R$ that are provided for each lens group. Set are angles (convergence angles) made mutually by the optical axes $L_L$, $L_R$ of the pick-up-image lens groups $811_L$, $811_R$. Further, the pick-up-image systems $810_L$, $810_R$ are provided with focus encoders $824_L$, $824_R$, zoom encoders $825_L$, $825_R$ and convergence angle encoders $826_L$, $826_R$. The focus encoders $824_L$, $824_R$ detect positions of the focusing lens groups $815_L$, $815_R$. The zoom encoders $825_L$, $825_R$ detect positions of the variable power lens groups $817_L$, $817_R$. The convergence angle encoders $826_L$, $826_R$ detect convergence angles. These encoders may involve the use of externally-attached members such as, e.g., potentiometers or elements for detecting positions and angles from signal information possessed by a driving system itself such as a pulse motor.

Figure 31:
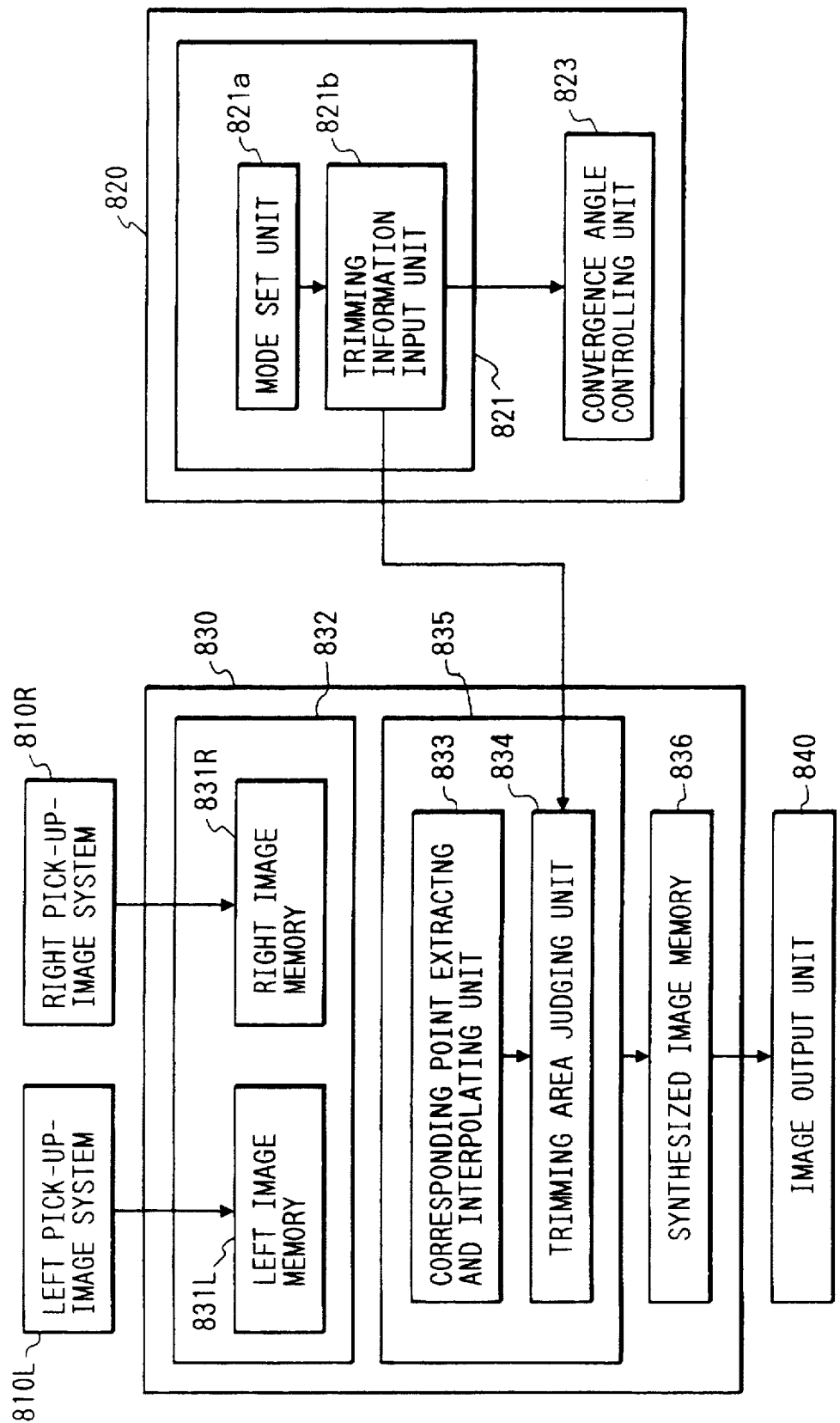
FIG. 31 is a block diagram showing an image processing unit and a control unit in the third embodiment.

On the other hand, an image output unit 840 is connected via an image processing unit 830 to each of the CCD sensors $813_L$, $813_R$. The image processing unit 830 has, as shown in FIG. 31, an image input unit 832, an image transforming unit 835 and a synthesized image memory 836. The image input unit 832 comprises right and left image memories $831_R$, $831_L$ for holding video signals defined as image signals from the CCD sensors $813_L$, $813_R$ (see FIG. 30) of the pick-up-image systems $810_L$, $810_R$. The image converting unit 835 generates one synthesized image on the basis of the right-and-left images obtained from the video signals inputted respectively to the image input unit 832. The synthesized image memory 836 holds the image synthesized by the image converting unit 835 and outputs the synthesized image to an image output unit 840. The image converting unit 835 further comprises a corresponding point extracting/interpolating unit 833 for extracting a corresponding point and performing an interpolating connection with respect to an image signal in the vicinity of a two-image connecting portion with respect to the two images inputted to the image input unit 832. The image converting unit 835 also comprises a trimming area judging unit 834 for judging a trimming area in the image on the basis of the trimming signal from the control unit 820. Further, the total system controlling unit 821 in the control unit 820 is provided with a mode set unit 821a capable of setting in an electronic trimming mode and a trimming information input unit 821b for inputting a trimming parameter when in the electronic trimming mode. The trimming signals set therein are transmitted to the convergence angle controlling unit 823 and the trimming area judging unit 834 in the image processing unit 830.

Figure 32:
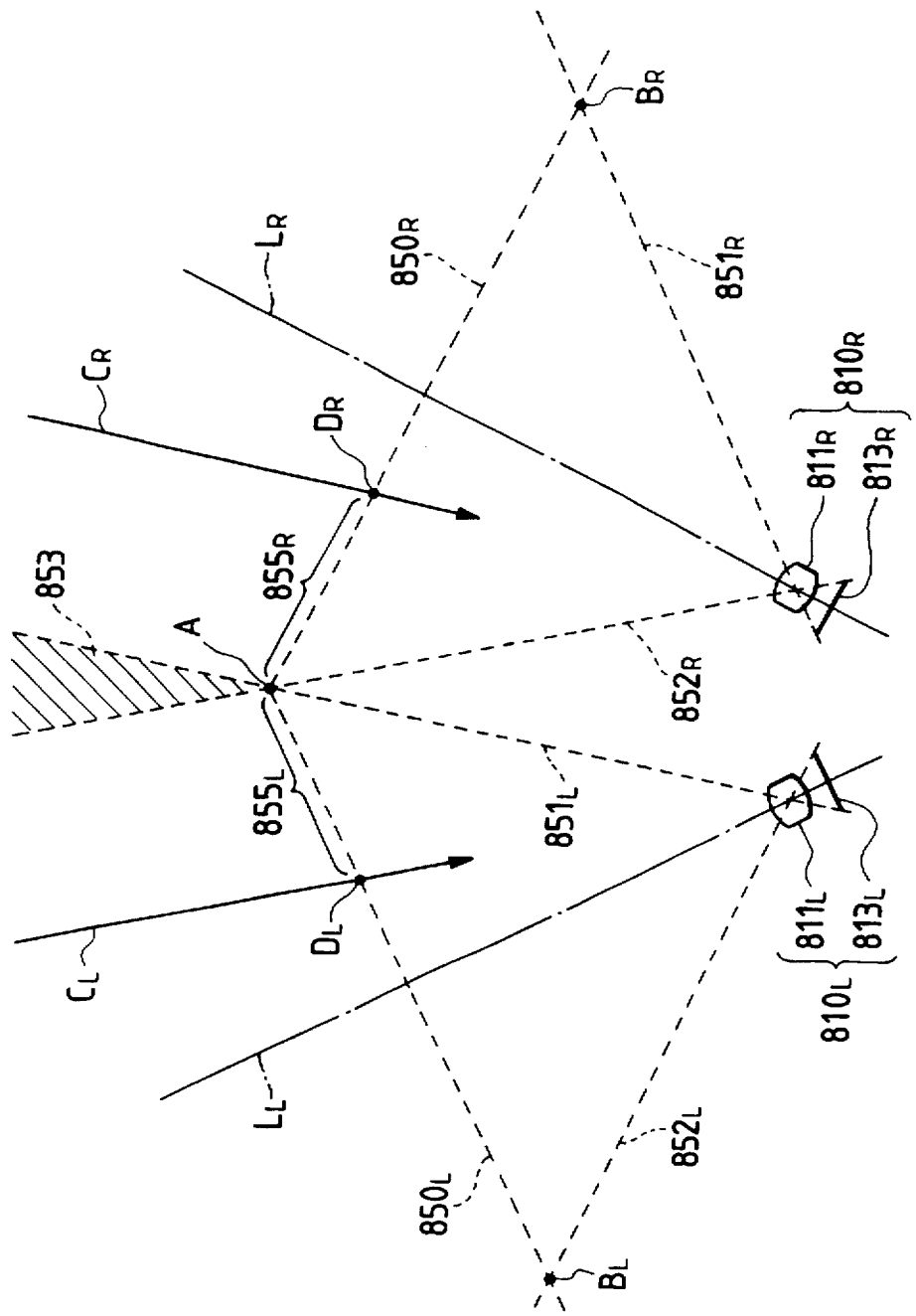
FIG. 32 is a schematic view showing a layout of optical systems in the third embodiment.

FIG. 32 is a view of principal elements of the optical system of the multieye imaging apparatus shown in FIG. 30 as viewed in the direction perpendicular to the plane formed by the optical axes $L_L$, $L_R$ of the pick-up-image lens groups $811_L$, $811_R$. For simplifying the explanation, however, the color separation prisms $812_L$, $812_R$ (see FIG. 30) are omitted. At the same time, the right and left CCD sensors $813_L$, $813_R$ are illustrated one by one. As depicted in FIG. 32, the pick-up-image lens group $811_R$ and the CCD sensor $813_R$ of the right pick-up-image system $810_R$ have a focusing object plane $850_R$. At the same time, a possible-to-image area is confined to an area interposed between straight lines $851_R$, $852_R$ by the effective light receiving element of the CCD sensor $813_R$. An effective object area is an area ranging from an intersection line $B_R$ to an intersection line A at which this focusing object plane $850_R$ intersects each of end planes $851_R$, $852_R$. In the left pick-up-image system $810_L$, the effective object area is similarly an area from the intersection line A to an intersection line $B_L$ of the focusing object plane $850_L$. The focus motors $814_L$, $814_R$ (see FIG. 30) and the zoom motors $816_L$, $816_R$ (see FIG. 30) of the right and left pick-up-image systems $810_R$, $810_L$ are controlled so that imaging magnifications and distances between the focusing object planes $850_L$, $850_R$ and the CCD sensors $813_L$, $813_R$ are bilaterally equal to each other. Besides, the convergence angle motors $818_L$, $818_R$ (see FIG. 30) are controlled so that the end portions of the effective object areas of the pick-up-image systems $810_L$, $810_R$ coincide with each other at the intersection line A. The motors $814_L$, $814_R$, $816_L$, $816_R$, $818_L$, $818_R$ are controlled through the control unit 820 (see FIG. 30) receiving the signals from the encoders $824_L$, $824_R$, $825_L$, $825_R$, $826_L$, $826_R$ (see FIG. 30). Particularly, the convergence angle motors $818_L$, $818_R$ are controlled interlocking with signals of end portion positions of the effective object areas as well as of positions of the focusing object planes $850_L$, $850_R$ that are calculated from signals outputted from the focus encoders $824_L$, $824_R$ and the zoom encoders $825_L$, $825_R$.

Explained next with reference to FIG. 31 are image processing procedures in the multieye imaging apparatus in accordance with this embodiment.

When imaging the objects through the right and left pick-up-image systems $810_L$, $810_R$ pieces of image information are inputted in the form of video signals to the image input unit 832 of the image processing unit 830 according to each of the pick-up-image systems $810_L$, $810_R$. The image information is held in the respective image memories $831_L$, $831_R$. The corresponding point extracting/interpolating unit 833 obtains interpolation parameters by extracting the corresponding points of two images by use of the image data in the vicinity of the connecting portion among the image signals of the image memories $831_L$, $831_R$.

The mode set unit 821a in the control unit 820 may effect processing by providing a mode switch for the exclusive use of electronic trimming based on an interrupt process or a changeover switch to other modes. The trimming information input unit 821b performs processing by providing a set of switches capable of continuously varying the aspect ratio from an increment side down to a decrement side. The parameter required at the minimum in this embodiment is a set value a in FIG. 29.

When set to the electronic trimming mode in the mode set unit 821a, there is set an image cut-out area on the basis of the set value α of the trimming information input unit 821b and an input image field parameter (a maximum aspect ratio of the synthesized image field) of a multieye imaging system at the time of mode setting. Then, an output synthesized image is developed on the synthesized image memory 836. This is converted into a standard image signal (NTSC, etc.) in the image output unit 840 and thereafter outputted.

The method of synthesizing the pair of images may involve the use of a method which will hereinafter be mentioned. According to this method, a template surrounding one point existing in, e.g., the left image is assumed. A corresponding point is determined by a comparison of similarity in the right image with respect to an image of the template. The images are joined by use of the corresponding point information. This method is classified into a step of aligning registrations in the horizontal and vertical directions and a step of correcting a deviation between magnifications.

Figure 35:
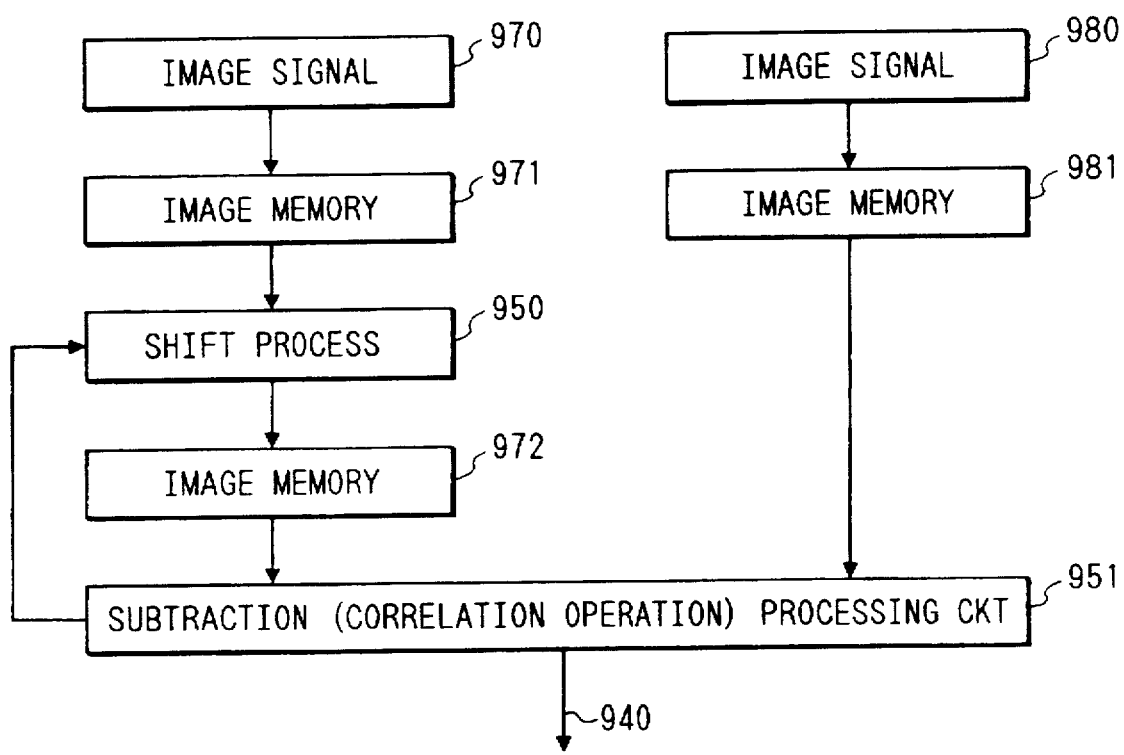
FIG. 35 is a view illustrating a configurational example for obtaining a deviation of registrations.

Explained at first is one example of the method of aligning the registrations in the horizontal and vertical directions. The following explanation is common to the both. A method of obtaining a deviation between the registrations from the image signals will be described with reference to FIG. 35. Image memories 971, 981 each temporarily store a signal of an overlapped area of image signals 970, 980. The image data is, however, presumed such that the image registrations are not coincident with each other due to a deviation in terms of the convergence angle. A horizontal image shift processing unit 950 shifts, for instance, coordinates of the image memory 971 by a fixed quantity (e.g., one pixel) in the horizontal direction. The image data after being shifted is written to the image memory 972. A correlation operation processing circuit 951 including a subtraction processing circuit calculates a difference δs between the image memories 972, 981 by sequentially varying the shift quantity X. The control takes place to obtain such a shift quantity $X_0$ that the difference δs takes the minimum value. At this time, the shift quantity $X_0$ is obtained by the interpolating operation process such as effecting an approximation-of-function process on a relationship of the difference δs versus the shift quantity X. The shift quantity $X_0$ obtained turns out a correction signal 940.

Next, one example of a method of correcting the deviations between the magnifications.

Figure 36:
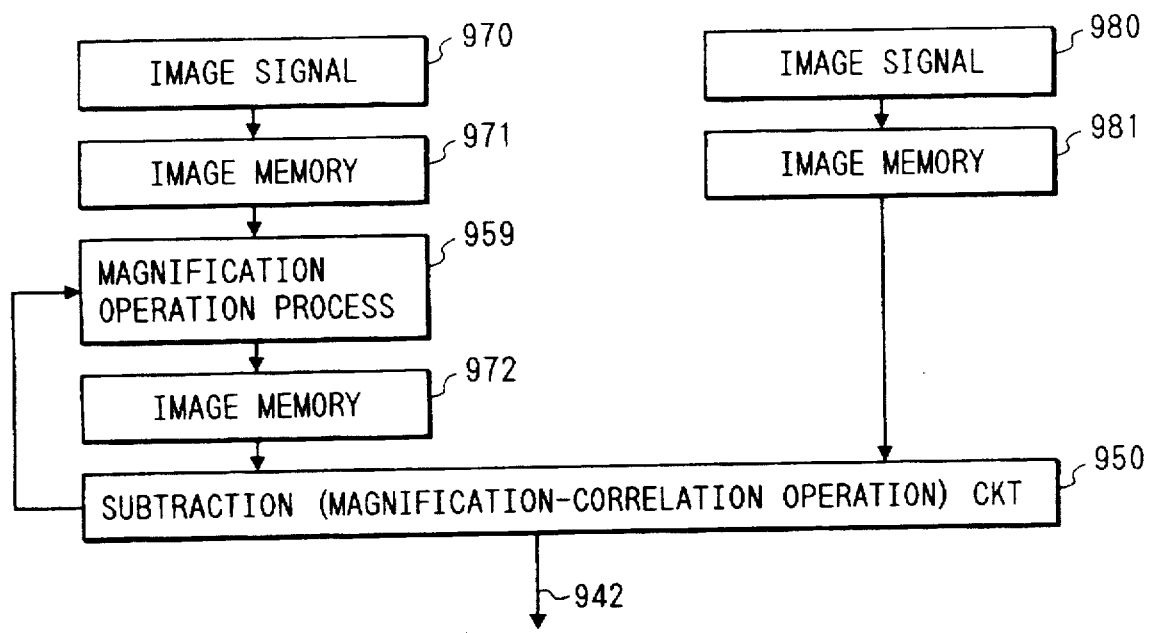
FIG. 36 is a view showing a configurational example for a magnification correlation operating process.

A method shown in FIG. 36 is one of magnification correlation operation processing methods. More specifically, a magnification operation processing unit 959 performs a coordinate transformation by multiplying the coordinates of the image memory 971 by a constant k proportional to a distance from the image center. The result is written to the image memory 972. Next, a difference δm between the image memories 972, 981 is obtained by using the subtraction processing circuit 950. The above subtraction is conducted while varying the constant k in sequence, thus obtaining such a constant $k_0$ that the difference δm takes the minimum value. FIG. 36 shows a flow of the signals thereof. This constant $k_0$ represents a ratio of the imaging magnification of one pick-up-image optical system to that of the other pick-up-image optical system. This ratio turns out a correction signal 942.

Figure 37:
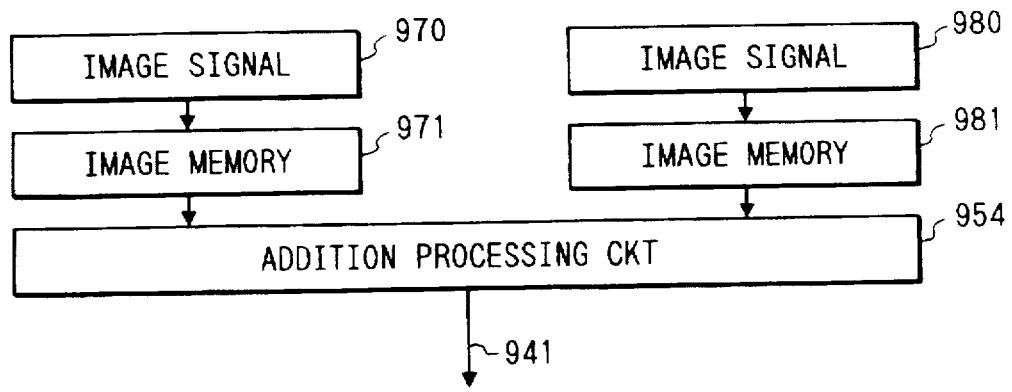
FIG. 37 is a diagram showing a flow of signals when connecting the images.

In this way, the deviation quantity between the registration magnifications of the image signals 970, 980 outputted from the respective pick-up-image systems are mechanically corrected down to a predetermined value (allowable value) or under by use of each actuator. Thereafter, the overlapped area of the image signals 970, 980 is joint-processed. After this processing, the two image signals can be synthesized into one image signal 941 by use of, e.g., the image memories 971, 981 and an addition processing circuit 954 and the like. FIG. 37 shows a flow of the signals thereof.

In accordance with this embodiment illustrated above, it is possible to construct the multieye imaging apparatus capable of outputting the synthesized image having the large aspect ratio (3:8, i.e., a laterally long shape in this embodiment) all the time without narrowing the actual image field. It is also feasible to provide the multieye imaging apparatus capable of instantaneously outputting the synthesized image formed at the aspect ratio that the photographer intends.

Figure 33:
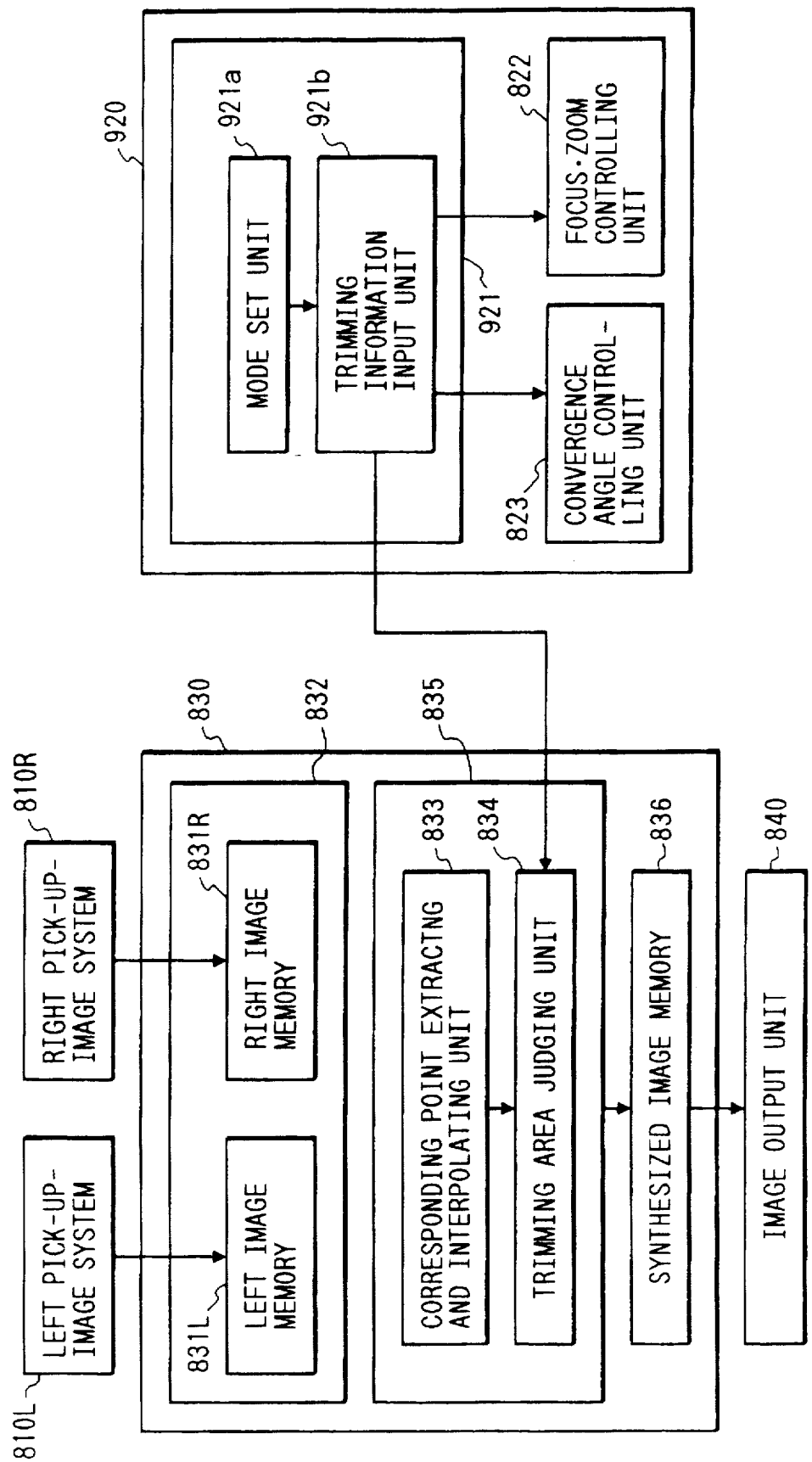
FIG. 33 is a block diagram showing the image processing unit and the control unit in a fourth embodiment of this invention.
Figure 34A:
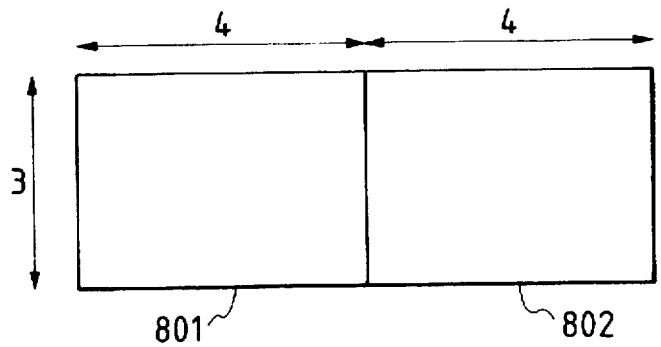
FIGS. 34A to 34E are explanatory views showing the variable aspect ratio image outputting in the fourth embodiment.
Figure 34B:
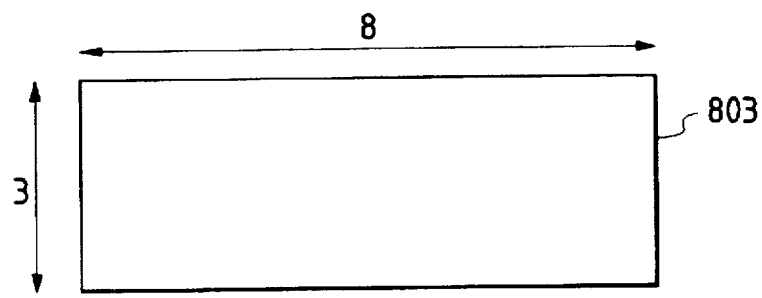
Figure 34C:
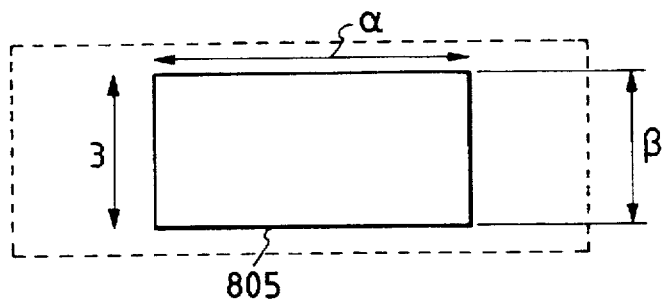
Figure 34D:
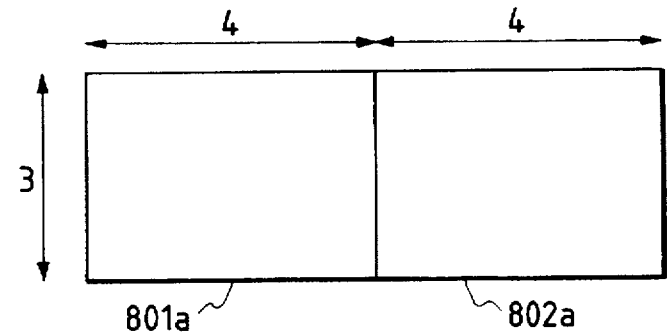
Figure 34E:
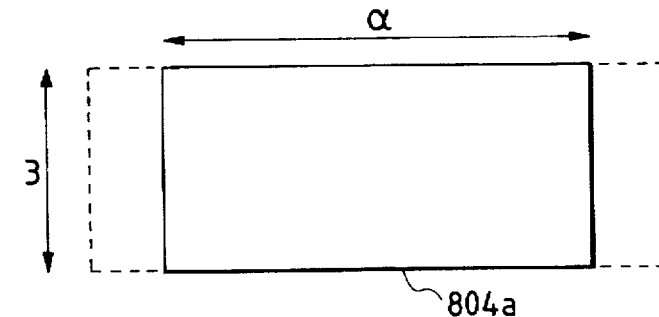

FIG. 33 depicts constructions of an image processing unit 830 and a control unit 920 in a fifth embodiment of this invention. The same elements as those in the fourth embodiment are marked with the like numerals. Further, the basic construction of the multieye imaging apparats is the same as that shown in FIG. 30. A total system controlling unit 921 within the control unit 920 corresponding to the control unit 820 of the fourth embodiment is provided with a mode set unit 921a and a trimming information input unit 912b. The mode set unit 921a is capable of setting to a hybrid trimming mode which will be explained later. The trimming information input unit 912b inputs trimming parameters when set to this hybrid trimming mode.

The hybrid trimming mode stated herein consists of the following two processing flows.

(Process 1)

The electronic trimming (however, trimming in the vertical direction as well) equal to that in the first embodiment.

(Process 2)

A transition to an optical trimming state.

(1) Held are the parameters when finishing the electronic trimming mode.

(2) Optical parameters are varied toward final values during the optical trimming.

At this time, a compensation is done with the electronic trimming parameters so to hold a trimming range.

FIG. 34 shows a relationship between images inputted from the right and left pick-up-image systems $810_L$, $810_R$ and variable aspect ratio output images which are trimming-outputted therefrom in this embodiment. In a normal mode, input images 801, 802 each having an aspect ratio 3:4 are given from the CCD sensors $813_L$, $813_R$ corresponding to the right and left pick-up-image systems $810_R$, $810_L$. The input images 801, 802 are synthesized in parallel in the horizontal direction into a synthesized output image 803 having an aspect ratio 3:8 (FIGS. 34A, 34B). The hybrid trimming mode is selected by the mode set unit 921a in FIG. 34. Hereat, first, the image-trimming is carried out in the first processing flow at an aspect ratio 3:α and a perpendicular trimming ratio β (the maximum width in the vertical direction is set to 1). Consequently, an output image 805 comes out (FIG. 34C). The processing done so far corresponds to the process 1. Subsequently in the second processing flow, optical parameters (a focal length and a convergence angle of the pick-up-image lens group $811_R$) are continuously varied (FIG. 34C→FIG. 34D) toward the optical parameters when imaged on the effective light receiving element of the CCD sensor at such an imaging magnification as to give the largest trimming range while keeping the same trimming range from this electronic trimming state. Turning to FIG. 34D, two broken lines correspond to vertical lines of the output image 805 of FIG. 34C. The trimming range in the process 1 when varying the optical parameters is kept. Hence, the trimming parameters are transferred from the total system controlling unit 921 to the trimming area judging unit 834, and the trimming image synthesization takes place (FIG. 34E). This is done based on the input image range of the right and left pick-up-image systems that is calculated from the above optical parameters.

In addition to the effects of the fourth embodiment, this embodiment discussed above exhibits the following effect. It is possible to combinatorially employ asymptotic transformations to the instantaneous trimming image output according to the intention of the photographer and to the finest trimming image output executable by the present multieye imaging apparatus. Accordingly, it is feasible to prevent a decline in terms of the image quality with a continuance of outputting the trimming image having a decreased resolving power as seen in the conventional art. Particularly in this embodiment, the multieye imaging apparatus incorporates the present function, and, therefore, a large effect can be exhibited when making the aspect ratio variable in the panorama image with an increasingly larger aspect ratio.

In accordance with the above embodiments, the state before selecting the trimming mode has been explained in the optical system layout to provide the aspect ratio 3:8. The present invention is not, however, restricted to this state. The effects of the present invention are not lost even in optical trimming states other than the aspect ratio 3:8 in the initial state.

Besides, in the embodiments discussed above, the focusing object planes of the right and left pick-up-image systems are not disposed on the same plane; and some geometrical distortion is caused in the image connecting area due to a trapezoidal distortion. Therefore, the light receiving planes of the CCD sensors of the right and left pick-up-image systems are disposed at a predetermined angle inclined to each optical axis. The focusing object planes can be thereby disposed on the same plane, and geometrical distortion can be also corrected with respect to the input image.

Further, in the embodiments described above, the layout is given so that the end portions of the focusing object planes of the two pick-up-image systems become coincident in the initial state. For absorbing the error induced in the mechanism controlling system, however, the layout is made in such a manner that the end portions of the focusing object planes are partially overlapped. An image-to-image correspondence in the overlapped portion is made. Based on this, the synthesizing process can be also performed.

Further, the embodiments discussed so far have shown the multieye imaging system comprising the two pick-up-image systems but can be constructed of, as a matter of course, three or more pick-up-image systems. The imaging device may involve the use of, e.g., an image pickup tube or the like other than the CCD. There can be also used an imaging device in which the color separation system is eliminated, but a mosaic-like color filter is provided on the light receiving element. Speaking further of the imaging device, the aspect ratio is not, as a matter of course, limited to 3:4.

The imaging apparatus capable of obtaining the image having an arbitrary aspect ratio can be provided. Furthermore, when performing the synthesizing process, the other image signal is joined based on one image signal. Accordingly, especially when the aspect ratio is comparatively small, it follows that the boundary line is located in the peripheral portion of the image. It is possible to provide the image exhibiting a less amount of deterioration in terms of image quality in the image central area.

Moreover, on the occasion of effecting synthesizing process, the information on the three-dimensional position of the image is obtained for removing the double image of the overlapped portion. The synthesizing process is conducted after the line-of-sight conversion. The high quality image can be provided also in the overlapped portion.

According to this invention, it is feasible to construct the multieye imaging apparatus capable of outputting the synthesized image having the large aspect ratio all the time without narrowing the actual image field. At the same time, it is possible to provide the multieye imaging apparatus capable of instantaneously outputting the synthesized image formed at the aspect ratio that the photographer intends. Combined also are the asymptotic transformations to the instantaneous trimming image output according to the intention of the photographer and to the finest trimming image output executable by the present multieye imaging apparatus. It is thus possible to prevent the decline in terms of the image quality with the continuance of outputting the image having the decreased resolving power in the trimming image synthesization.

It is apparent that, in this invention, a wide range of different working modes can be formed based on the invention without deviating from the spirit and scope of the invention. This invention is not restricted by its specific working modes except being limited by the appended claims.

What is claimed is:

1. A multieye imaging apparatus, having a plurality of imaging optical systems and a plurality of pick-up-image systems constructed of an imaging device corresponding respectively to said plurality of imaging optical systems, for generating a synthesized image by use of an image signal outputted from said imaging device, said apparatus comprising:

a plurality of image inputting means for respectively holding image signals outputted from said pick-up-image systems;

a total system controlling means for inputting an image trimming signal containing an aspect ratio designated value;

an image transforming means for output-generating an aspect-ratio-variable image on the basis of an image signal held by said image inputting means and an image trimming signal inputted for said total system controlling means;

a means for holding an image trimming area; and a controlling means for varying an optical parameter of said plurality of pick-up-image systems while an image trimming area designated by said image trimming signal is held by said means for holding, said image trimming area corresponding to the aspect ratio designated value inputted to said total system controlling means, after said image transforming means has outputted the image and, when said image trimming signal is changed, for generating an output image by said image transforming means from the image signal then retained by said image inputting means based on said changed image trimming signal, and thereafter for changing optical parameters of said plurality of pick-up-image systems based on said changed image trimming signal, said controlling means changes said image trimming signal according to changes of said optical parameter in order to maintain said image trimming area when said optical parameter is varied.

2. The multieye imaging apparatus according to claim 1, wherein the optical parameter includes a focal length and a convergence angle of said plurality of pick-up-image systems.

3. The multieye imaging apparatus according to claim 1, further comprising:

means for designating an optical parameter; and wherein optical axes of said plurality of pick-up-image systems includes such a system as to vary in a direction parallel to one plane, and a final designated value of the optical parameter after being varied is such that a perpendicular effective width, perpendicular to one plane, of a light receiving element of said plurality of pick-up-image systems is coincident with a perpendicular effective width of the image trimming area.

4. The multieye imaging apparatus according to claim 4, further comprising:

controlling means for controlling a necessary area for generating a synthesized image where outputted images from said pick-up-image systems are mutually overlapped according to a distance to an object and/or imaging magnification.

5. The multieye imaging apparatus according to claim 4, wherein the overlapped area is controlled by said controlling means so that the overlapped area becomes minimal in size.

6. The multieye imaging apparatus according to claim 4, wherein the optical parameter includes a focal length and a convergence angle of said plurality of pick-up-image systems.

7. The multieye imaging apparatus according to claim 4, further comprising:

means for designating an optical parameter; and wherein optical axes of said plurality of pick-up-image systems includes such a system as to vary in a direction parallel to one plane, and a final designated value of the optical parameter after being varied is such that a perpendicular effective width, perpendicular to one plane, of a light receiving element of said plurality of pick-up-image systems is coincident with a perpendicular effective width of the image trimming area.

8. A multieye imaging apparatus comprising:

a plurality of image pickup systems, wherein a base image picked up by one of said plurality of pick-up image systems and a reference image picked up by the other one thereof are overlapped;

image pickup condition detecting means for detecting an image pickup condition as to at least one of said plurality of image pickup systems;

focusing means for performing focusing for said base image based on an image in a focus area of said base image to set a focusing area of said reference image corresponding to a focusing area of said base image based on said image pickup condition to perform focusing for said reference image based on an image in said focusing area of said set reference image;

correlation processing means for detecting an overlapped image between said base image and said reference image by correlation calculation wherein an image including said focusing area for said base image and an image including a focusing area for said reference image are used, after focusing for each of said base image and said reference image is completed; and combine processing means for producing a combined image by combining a remaining area of said reference image obtained by excluding said overlapped image from said reference image based on a detection signal from said correlation processing means with said base image.

9. The multieye imaging apparatus according to claim 8, further comprising:

image distortion correction conversion processing means for correcting distortions of a plurality of images output from said plurality of image-pick-up systems.

* * * * *